(12) United States Patent
Austin et al.

(10) Patent No.: US 11,569,624 B2
(45) Date of Patent: Jan. 31, 2023

(54) ELECTRICAL FIXTURE QUICK CONNECT MOUNT

(71) Applicant: MagTown, LLC, Edmonds, WA (US)

(72) Inventors: Darren Glenn Austin, Edmonds, WA (US); Mardee Coyle Austin, Edmonds, WA (US); Corey Bernard Mack, Greensboro, NC (US)

(73) Assignee: MAGTOWN, LLC, Edmonds, WA (US)

(*) Notice: Subject to any disclaimer, the term of this patent is extended or adjusted under 35 U.S.C. 154(b) by 0 days.

(21) Appl. No.: 17/718,866

(22) Filed: Apr. 12, 2022

(65) Prior Publication Data

US 2022/0337010 A1    Oct. 20, 2022

Related U.S. Application Data

(60) Provisional application No. 63/310,943, filed on Feb. 16, 2022, provisional application No. 63/176,132, filed on Apr. 16, 2021.

(51) Int. Cl.

| H01R 13/66 | (2006.01) |
| H01R 33/975 | (2006.01) |
| F16B 2/18 | (2006.01) |
| H01R 33/06 | (2006.01) |
| H01R 43/26 | (2006.01) |

(52) U.S. Cl.
CPC ............. *H01R 33/975* (2013.01); *F16B 2/18* (2013.01); *H01R 33/06* (2013.01); *H01R 43/26* (2013.01)

(58) Field of Classification Search
CPC ...... F21V 23/06; H02G 3/20; H01R 13/4538; H01R 13/71
See application file for complete search history.

(56) References Cited

U.S. PATENT DOCUMENTS

| 3,096,070 A | * | 7/1963 | Wolfensperger ...... F16K 41/046 277/516 |
| 4,135,546 A | * | 1/1979 | Morrison ................ F16K 41/14 137/315.35 |

(Continued)

FOREIGN PATENT DOCUMENTS

| EP | 3096070 A1 | 11/2016 |
| JP | 2001283631 A | 10/2001 |

(Continued)

OTHER PUBLICATIONS

PCT/IB2022/053444, International Search Report, dated Jul. 13, 2022.

(Continued)

*Primary Examiner* — Phuong Chi Thi Nguyen
(74) *Attorney, Agent, or Firm* — Rowan TELS LLC

(57) ABSTRACT

A method and apparatus for quick, safe, and easy installation of electrical fixtures in the building construction field, including connecting the fixture to a mounting mechanism for structural support and electrical service. A coupling mechanism is attached to or incorporated into the fixture. The coupling mechanism has built-in electrical leads that are designed to connect with the electrical leads on a fixture-facing interface of the mounting mechanism. Electrical leads on the coupling mechanism are connected via wire or other electrically conductive material to the electrical components in the fixture.

13 Claims, 31 Drawing Sheets

(56) References Cited

U.S. PATENT DOCUMENTS

| | | | | |
|---|---|---|---|---|
| 4,810,207 | A | 3/1989 | Butterfield | |
| 6,648,488 | B1 * | 11/2003 | Pearce | F21V 33/0096 |
| | | | | 362/147 |
| 7,143,988 | B2 * | 12/2006 | Blateri | F16B 39/04 |
| | | | | 248/343 |
| 8,231,403 | B2 * | 7/2012 | Smith | H01R 13/625 |
| | | | | 439/529 |
| 10,989,400 | B2 * | 4/2021 | Kohen | F21V 21/03 |
| 2011/0174943 | A1 | 7/2011 | Smith | |

FOREIGN PATENT DOCUMENTS

| | | |
|---|---|---|
| WO | 2012052870 A1 | 4/2012 |
| WO | 2018165058 A1 | 9/2018 |

OTHER PUBLICATIONS

PCT/IB2022/053444, Written Opinion of the International Searching Authority, dated Jul. 13, 2022.

\* cited by examiner

ELECTRICAL FIXTURE QUICK CONNECT MOUNT

CROSS-REFERENCE TO RELATED APPLICATIONS

This application claims the benefit of U.S. provisional patent application Ser. No. 63/310,943, filed on Feb. 16, 2022, and U.S. provisional patent application Ser. No. 63/176,132, filed on Apr. 16, 2021, the contents of each incorporated herein by reference in their entirety.

BACKGROUND

Every year homeowners, builders, and electrical tradespeople install millions of electrical ceiling fixtures (e.g., lights, ceiling fans, chandeliers, etc.) in residential and commercial buildings. The tools, equipment, and installation methods for installing electrical ceiling fixtures are well known and have not materially changed in decades. After first disconnecting the power to the electrical circuit, a conventional method involves six major steps (as illustrated in FIG. 1).

Drawbacks of Conventional Methods and Equipment

While conventional methods of installing electrical fixtures described with respect to FIG. 1 is well-known and may typically be accomplished by amateur builders and homeowners with a small amount of home improvement knowledge, this method suffers from several drawbacks:
1. The process is time-consuming, requiring anywhere from 20 minutes to an hour to install a single fixture.
2. The process may be physically difficult because the conventional method needs the installer to physically support the weight of the fixture, which may often be significantly heavy, above their head while making the permanent electrical connections.
3. Once a fixture is installed, removing the fixture, either for maintenance or to replace it, involves disconnecting the power to the electrical circuit serving the fixture at the building electrical panel. Then the permanent electrical connections from the fixture to the utility wiring need to be manually disconnected as well. For this step, the installer again needs to suspend the fixture above their head while disconnecting the permanent electrical connections.

Solutions such as mounting brackets with hooks have been introduced to help alleviate the physical burden of having to suspend heavy fixtures overhead while making the permanent electrical connections, as shown in FIG. 2. While addressing one problem, these solutions do not reduce the amount of time it takes to install or replace a fixture, nor do they address the need to manually undo the permanent electrical connections when replacing or conducting maintenance on the fixture.

Similarly, there exist specialty brackets like a ceiling fan collar assembly (FIG. 3) that aim to improve the ceiling fan installation process, but like other mounting bracket assemblies, these address the structural support needed during installation and do not address the need to manually wire the ceiling fan to the building electrical service.

Floor lamps and wall-connected fixtures have long had a solution to eliminate the need to install a permanent, hard-wired connection between electrical fixtures and a building power source. This solution, of course, is the familiar electrical wall outlet and fixture plug that allow fixtures to be quickly plugged into the building power source. The wall outlet design allows for fixtures to be quickly installed and replaced, but it does not provide load-bearing capability so it is inadequate for use in ceiling installations without additional structural support in place to bear the weight of the fixture.

There is, therefore, a need for a new method and apparatus for attaching ceiling fixtures that combines the load-bearing capability of a physical support bracket with the simple and fast electrical connection of a standard wall outlet so that electrical connections and physical installation of a ceiling fixture may be completed in a single action without the need to disconnect power to the electrical circuit at the building's electrical panel.

BRIEF SUMMARY

In one aspect, an apparatus of the quick-connect system may include a mounting mechanism with at least one ceiling structural connection point configured to accept at least one fastener to provide mounting mechanism structural support between the mounting mechanism and a ceiling support system. The mounting mechanism may also include utility power contacts configured to electrically connect to utility electrical power. The mounting mechanism may further include female coupling mechanism power contacts, each electrically connected to one of the utility power contacts by one of the mounting mechanism electrical leads. The mounting mechanism may also include a mounting mechanism housing configured to receive and connect to a coupling mechanism using a quick-connect system, provide coupling mechanism structural support, and insulate mounting mechanism electrical leads. The apparatus may also include a coupling mechanism with male coupling mechanism power contacts configured to electrically connect to the female coupling mechanism power contacts of the mounting mechanism using the quick-connect system and fixture power contacts, each electrically connected to one of the male coupling mechanism power contacts by one of coupling mechanism electrical leads. The coupling mechanism may also include a coupling mechanism housing configured to connect to and receive structural support from the mounting mechanism housing using the quick-connect system, provide electrical fixture structural support, and insulate the coupling mechanism electrical leads, where fixture electrical leads of an electrical fixture receive the utility electrical power through connection with the fixture power contacts of the coupling mechanism.

In one aspect, a method may include electrically connecting utility power contacts of the mounting mechanism to utility electrical power and securing a mounting mechanism of a quick-connect system to a ceiling support system using at least one fastener. The method may further include performing an engaging action to engage an electrical fixture equipped with a coupling mechanism of the quick-connect system with the mounting mechanism, where the engaging action includes at least a first engaging motion that moves the coupling mechanism through a coupling gap at least one of rotationally, along a straight path, and along a curved path, such that the coupling mechanism is at least one of structurally engaged and electrically engaged within the mounting mechanism.

BRIEF DESCRIPTION OF THE SEVERAL VIEWS OF THE DRAWINGS

To easily identify the discussion of any particular element or act, the most significant digit or digits in a reference number refer to the figure number in which that element is first introduced.

FIG. 18A illustrates a conventional mounting kit for a lighting electrical fixture 1800a.

DETAILED DESCRIPTION

Figure 1:
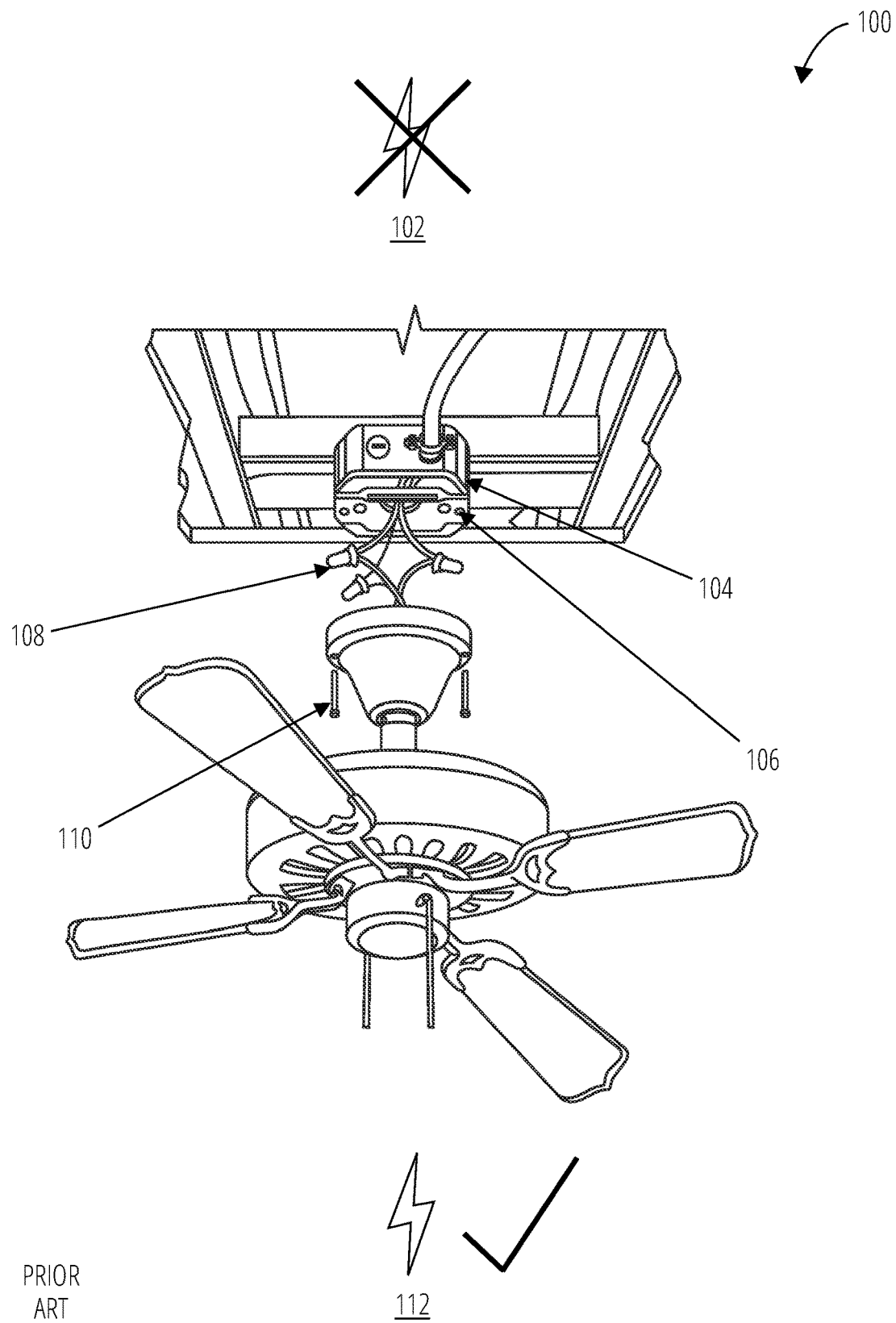
FIG. 1 illustrates a conventional ceiling installation 100.

The quick-connect system apparatus and method disclosed herein comprise a novel solution for installing electrical fixtures in the building construction field. "Quick-connect system" in this disclosure refers to the novel solution presented herein for mechanically, structurally, and electrically connecting an electrical fixture to building electrical power and a ceiling support system in a safe and easy single-step action. "Electrical fixture" in this disclosure refers to a device or integrated set of devices intended to run off of utility electrical power and to be suspended from a ceiling through direct or indirect connection to a ceiling support system. Examples of electrical fixtures are lighting electrical fixtures such as chandeliers and ceiling-mounted overhead lights, and ceiling fan electrical fixtures with or without integrated lighting electrical fixtures. These examples are not intended to be limiting, and one skilled in the art may easily conceptualize similar electrical fixtures not described herein.

The quick-connect system utilizes a new type of electromechanical apparatus that connects permanently to a building's structural support and electrical service using conventional methods, and, once in place, allows an electrical fixture to be quickly and easily connected and disconnected to both a building's structural supports and electrical service in a single action, without the need to disconnect the electrical circuit serving the fixture at the building electrical box. This new quick-connect system apparatus comprises a mounting mechanism installed permanently to the building structural and electrical systems and a coupling mechanism installed on the electrical fixture.

To connect an electrical fixture to the mounting mechanism for structural support and electrical service, the coupling mechanism may be attached to (or incorporated into) the fixture. The coupling mechanism may have built-in electrical contacts that are designed to connect with electrical contacts on a fixture-facing interface of the mounting mechanism, referred to herein as male coupling mechanism power contacts. The coupling mechanism may be connected via wire (or other electrically conductive material) to the electrical components (e.g., lighting, electric motor, etc.) in the fixture at fixture power contacts. When fully assembled, electricity may flow from the building electrical supply through the terminals or contacts on the mounting mechanism and the coupling mechanism to the wiring and electrical components of the fixture itself.

This new method and apparatus provide permanent structural support and permanent electrical connections to a building after a one-time installation of the mounting mechanism using conventional methods (i.e., permanently connecting the mechanism to a building's ceiling or floor joists or wall studs and permanently connecting the utility electrical power wires to appropriate electrical posts on the mechanism). The new method and apparatus may then allow an electrical fixture with a coupling mechanism installed, either at home after sale or during manufacturing, to be attached to and detached from the mounting mechanism's fixture-facing interface quickly and easily with a single engaging action so that both the structural support and electrical service for the fixture are completed in the one or two actions without the need to cut power to the fixture at the building's electrical panel.

"Engaging action" in this disclosure refers to a set of one or two simple motions that result in the coupling mechanism of this disclosure being structurally and electrically connected and secured within the mounting mechanism of this disclosure. In one embodiment, the engaging action comprises a first engaging motion and a second engaging motion. "First engaging motion" in this disclosure refers to a motion of the coupling mechanism with affixed electrical fixture that moves the coupling mechanism through a coupling gap such that the coupling mechanism is structurally engaged within the mounting mechanism, or structurally engaged and electrically engaged within the mounting mechanism. "Second engaging motion" in this disclosure refers to an additional motion of the coupling mechanism with affixed electrical fixture that may be performed to complete structural or electrical engagement of the coupling mechanism within the mounting mechanism if design of the quick-connect system necessitates more than one engaging motion. The second engaging motion may be a linear or rotational motion of the coupling mechanism within the mounting mechanism once the first engaging motion has engaged the coupling mechanism within the mounting mechanism.

The electrical connections on the mounting mechanisms described herein may be of any suitable design to accommodate electrical shielding requirements of local building electrical and fire codes, as is well understood by those of skill in the art. For example, the utility power contacts may be provided as screw terminals that tighten around bare-wire pigtails, spade terminals, hook terminals, and ring terminals in the utility wiring. This method of connection is similar to how standard electrical wall outlets connect to building electrical wire. The terminals may also be designed as wire connectors that provide an insulating barrier between the electrical wire and outside surfaces. "Wire connector" in this disclosure refers to a pinned connector, a push-in connector, or other type of connector configured to receive wires into at least one end of its connector terminals, or configured to mate with a complementary connector configured to receive wires. The design of the mounting mechanism may feature any form of permanent electrical and structural connections to the building while also providing a single, temporary electrical and structural connection to the fixture.

In addition to facilitating easier and faster electrical connections, this new mounting mechanism provides load-bearing capabilities for the ceiling fixture so that installing the fixture structurally and electrically may be completed in a single step taking a few seconds once the initial connections from the mounting mechanism to the building are in place.

The solution disclosed herein may be used in any scenario where both electrical service and structural support are needed for a fixture or appliance. In the building construction field, it may be used in new construction or during a building remodel. It is appropriate for residential or commercial applications.

FIG. 1 illustrates a conventional ceiling installation 100, comprising steps 102-112. Repairing or replacing a fixture installed using these steps may need to begin with these steps being repeated in reverse order.

At step 102, before starting the installation process, the electrical service supplying the fixture may need to be disconnected by opening the appropriate breaker (not shown) for the ceiling circuit at the electrical panel.

At step 104, an electrical junction box with load-bearing capability may be installed, mounted to the ceiling joists above the finished ceiling using nails or wood screws.

At step 106, a mounting bracket may be installed to the electrical junction box to connect to the fixture to be installed and support the weight of the fixture.

At step 108, the fixture's electrical wires may be connected to the building's electrical power source using wire nuts or other standard electrical connectors intended to establish a permanent electrical connection.

At step 110, the new fixture may be secured to the support bracket installed in step 106 using machine screws.

Finally, at step 112, the electrical service may be returned to the circuit by closing the appropriate breaker (not shown) in the electrical panel.

Figure 2:
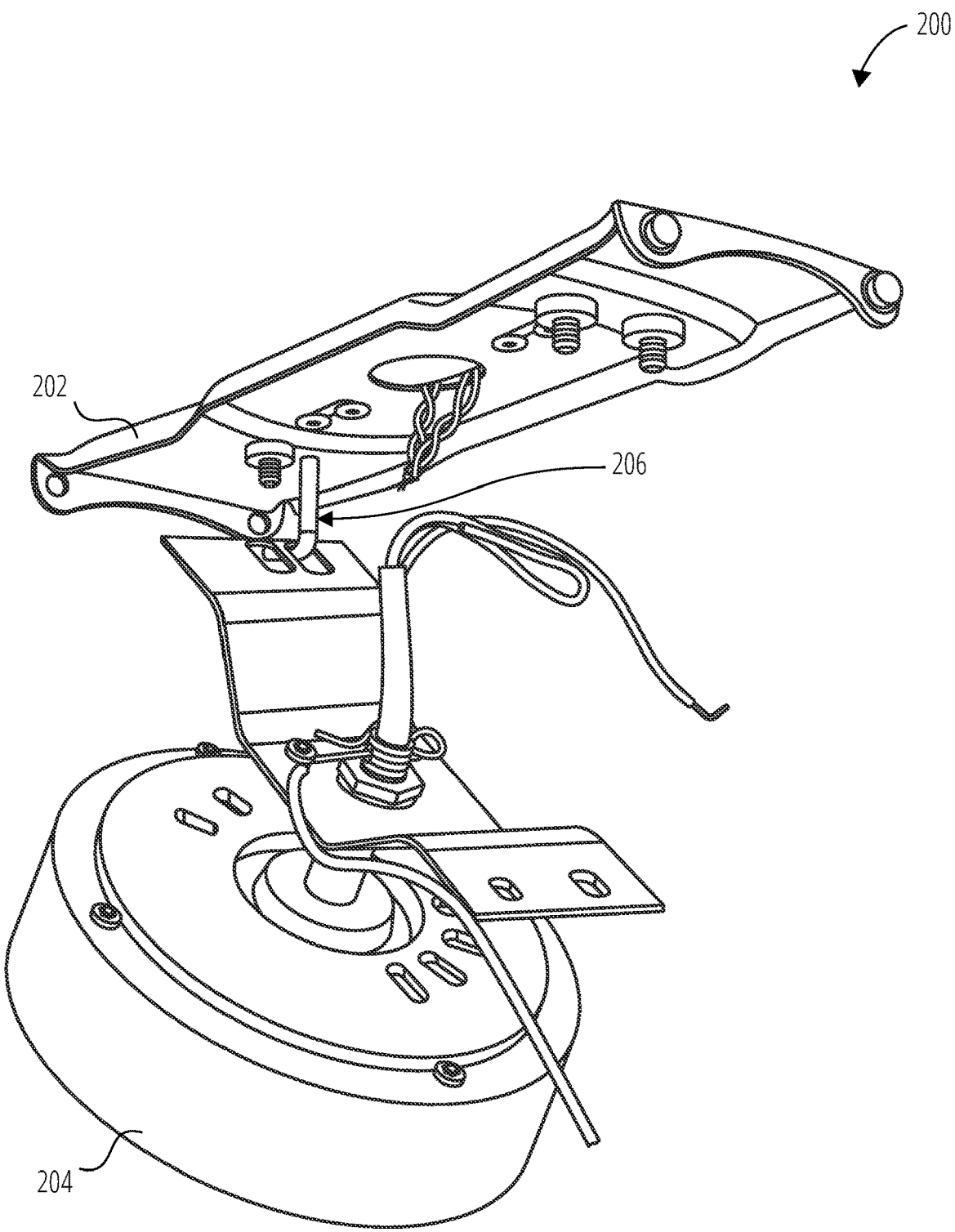
FIG. 2 illustrates a conventional support hook solution 200.

FIG. 2 illustrates a conventional support hook solution 200 in accordance with one embodiment. The conventional support hook solution 200 comprises a mounting bracket 202, an electrical fixture 204, and a support hook 206.

The mounting bracket 202 incorporates a support hook 206 that may support the electrical fixture 204 while electrical wiring connections are made. While addressing the issue of supporting the weight of the fixture during installation, this solution may not reduce the amount of time it takes to install or replace a fixture, nor does it address the need to manually undo the permanent electrical connections when replacing or conducting maintenance on the fixture.

Figure 3:
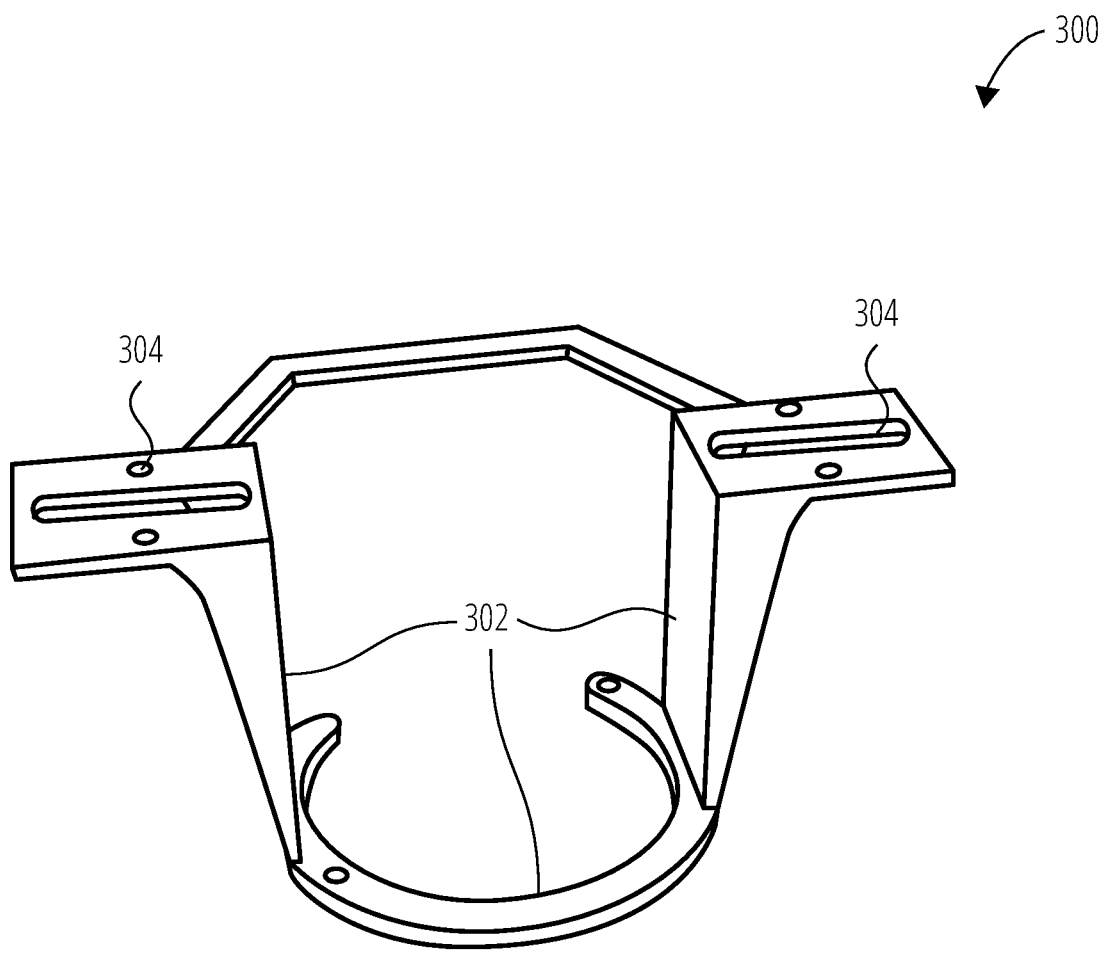
FIG. 3 illustrates a conventional fan bracket 300.

FIG. 3 illustrates a conventional fan bracket 300. The conventional fan bracket 300 aims to improve the ceiling fan installation process by providing structural support for a ceiling fan electrical fixture. The conventional fan bracket 300 may have inner contours 302 configured to conform to ceiling fan assemblies generally, or to a specific assembly intended for insertion. The conventional fan bracket 300 may further comprise fan bracket ceiling structural connection points 304, where fasteners may be inserted and secured to the ceiling support system to provide electrical fixture structural support.

Like other conventional mounting bracket assemblies, however, the conventional fan bracket 300 addresses the structural support needed during installation but not the need to manually wire the ceiling fan to the building electrical service.

Figure 4:
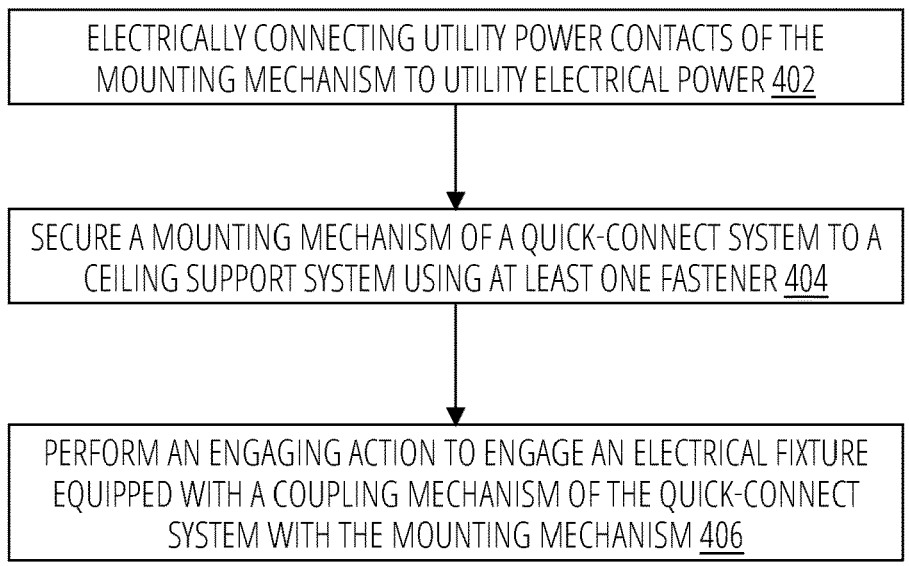
FIG. 4 illustrates a quick-connect system routine 400 in accordance with one embodiment.

FIG. 4 illustrates a quick-connect system routine 400 in accordance with one embodiment. In contrast to the process described in FIG. 1, the quick-connect system routine 400 may be accomplished in three steps. In these steps, those in block 402 and block 404 may involve working above the head on a ladder or stepstool. In these steps, the object being worked with above the head (a mounting mechanism) may be much lighter than a conventional ceiling-mount electrical fixture. The quick-connect system routine 400 thus represents a significant improvement over conventional installations in terms of ease, speed, and safety.

Figure 7A:
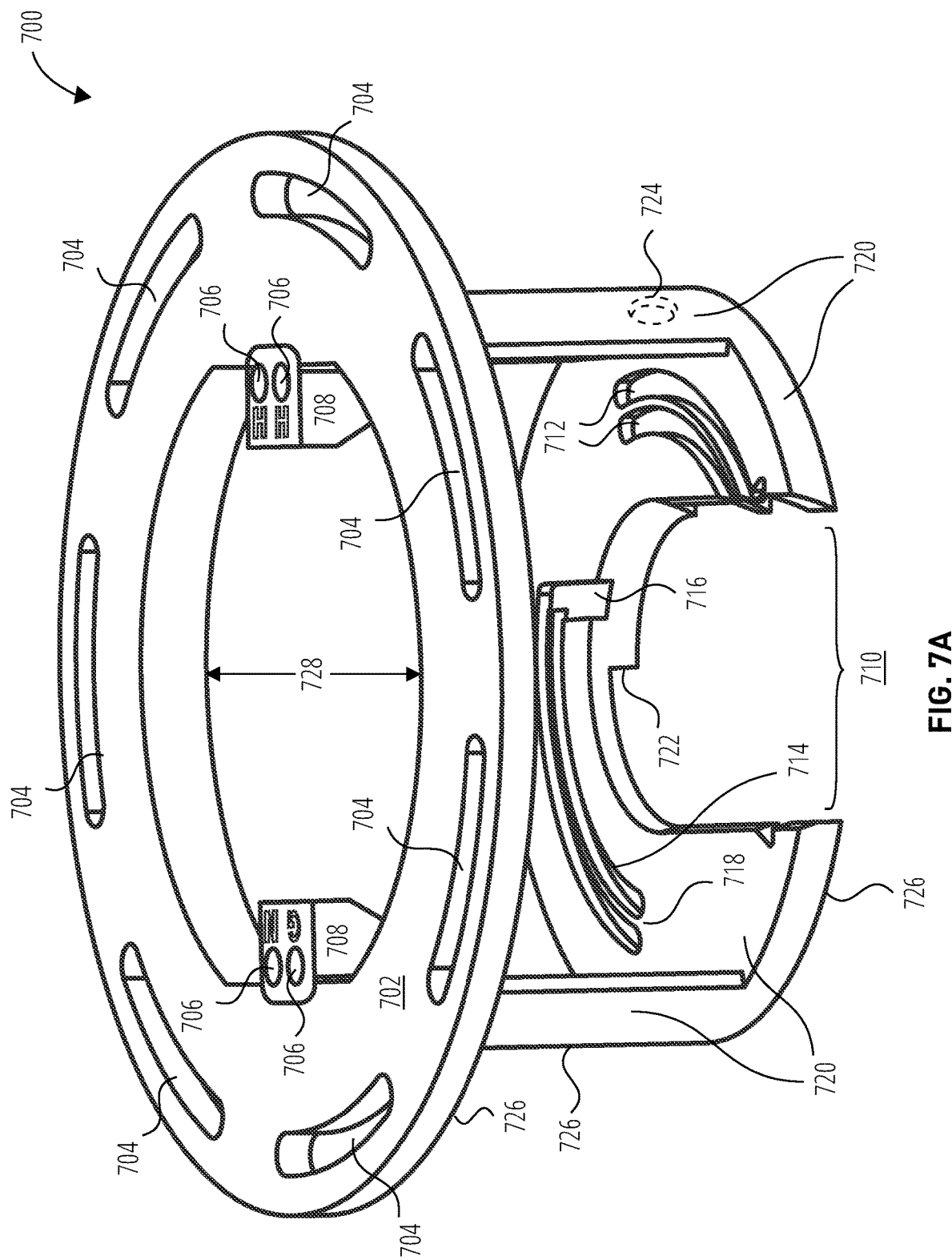
FIG. 7A illustrates a mounting mechanism 700 in accordance with one embodiment.
Figure 23A:
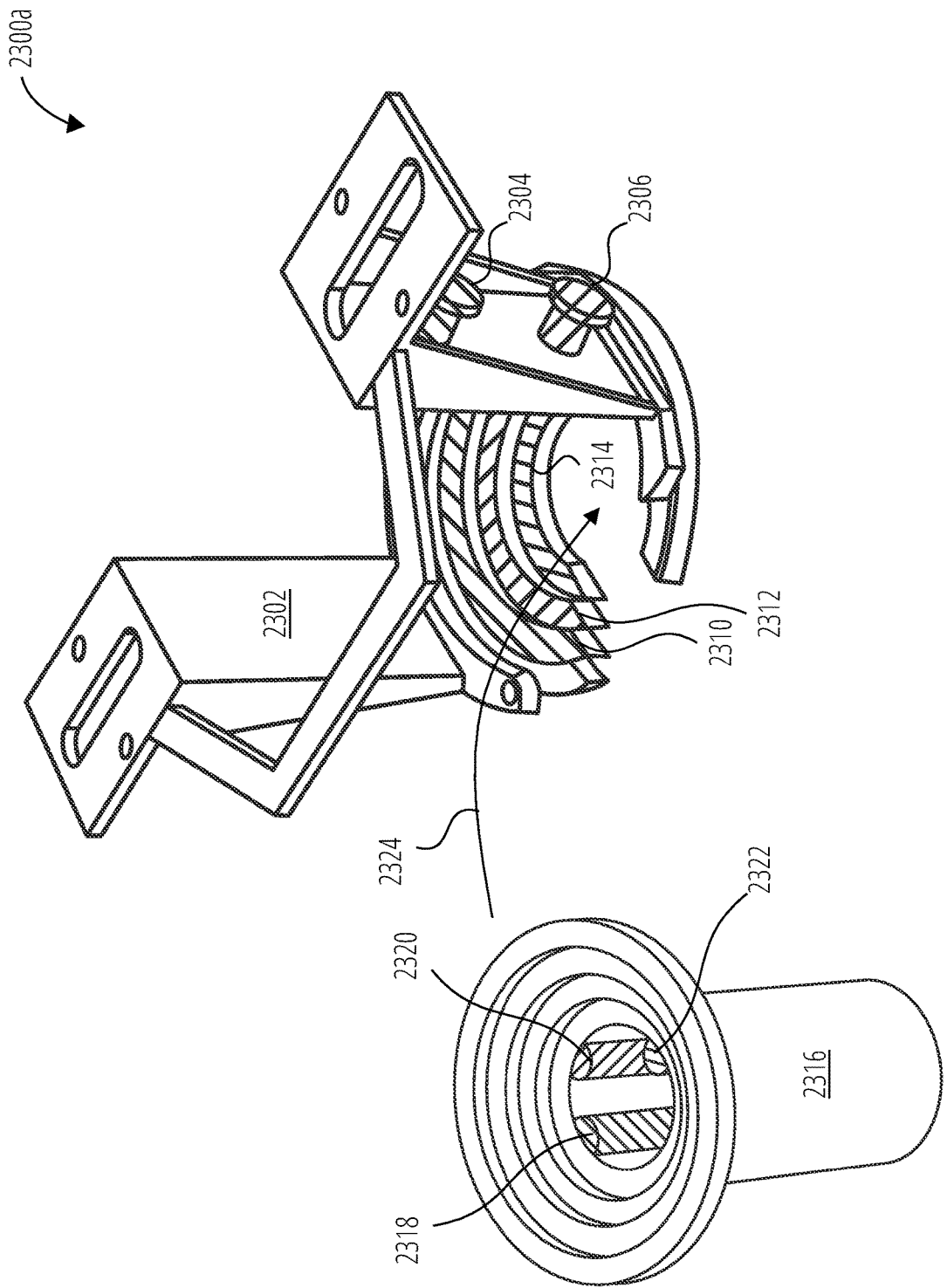
FIG. 23A illustrates a top, right view of the mounting mechanism and coupling mechanism 2300a in accordance with one embodiment.
Figure 24A:
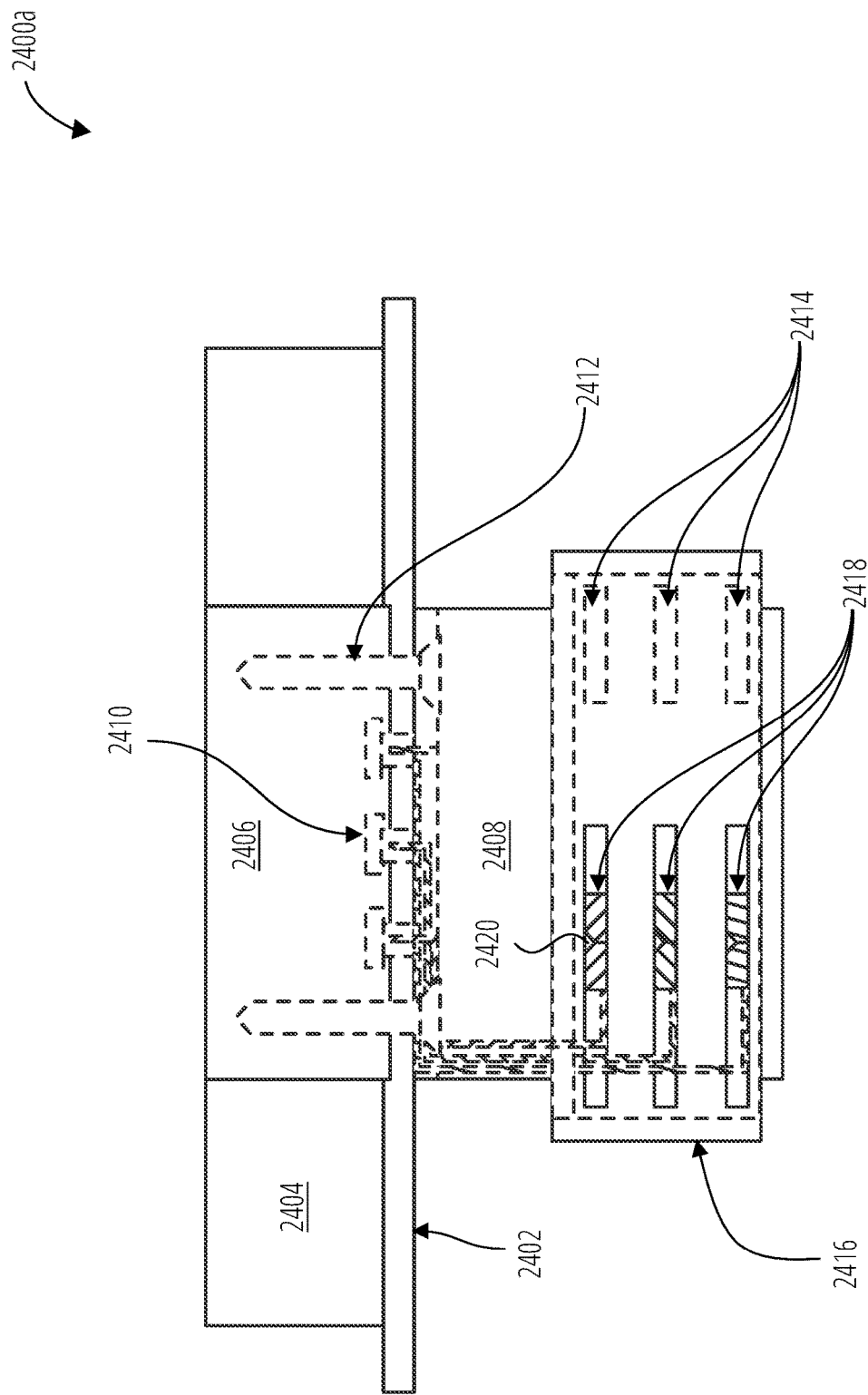
FIG. 24A illustrates a mounting mechanism side view showing a junction box connection 2400a in accordance with one embodiment.

At block 402, utility power contacts of a mounting mechanism of the quick-connect system 506, such as those illustrated in FIG. 7A, FIG. 23A, and FIG. 24A, among other figures in this disclosure, may be electrically connected to utility electrical power. In block 404, the mounting mechanism may then be connected structurally to a ceiling support system using at least one fastener.

Figure 8:
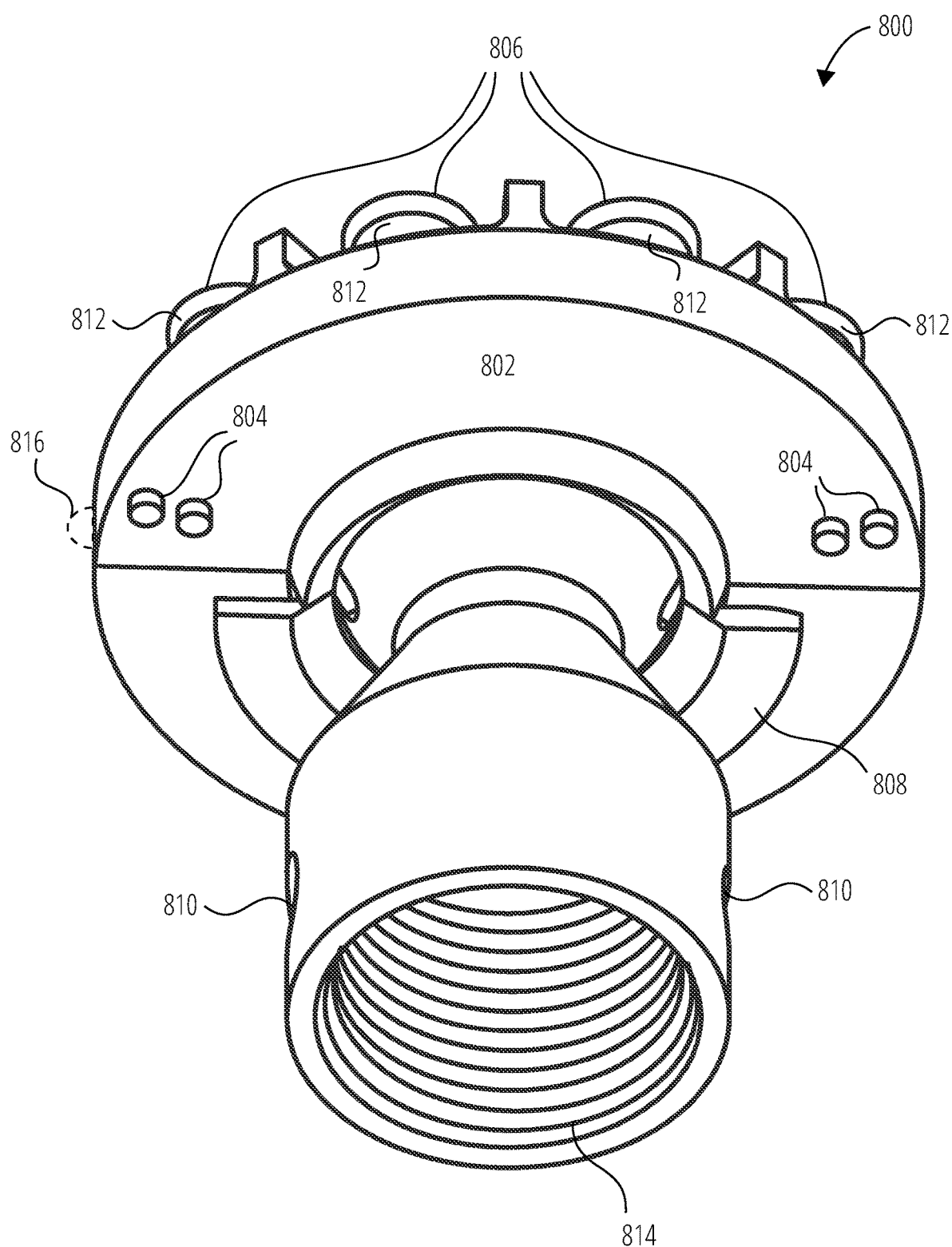
FIG. 8 illustrates a coupling mechanism 800 in accordance with one embodiment.

In block 406, an engaging action may be performed to engage an electrical fixture equipped with a coupling mechanism of the quick-connect system with the mounting mechanism. The coupling mechanism may be such as are illustrated in FIG. 8, FIG. 23A, and FIG. 24C, among other figures in this disclosure.

In one embodiment, the engaging action may comprise at least a first engaging motion that moves the coupling mechanism through a coupling gap into the mounting mechanism housing of the mounting mechanism. The first engaging motion may be a rotational motion, may be a motion along a straight path, or a motion along a curved path. The first engaging motion may structurally engage the coupling mechanism within the mounting mechanism, electrically engage the coupling mechanism within the mounting mechanism, or both.

In some embodiments, a second engaging motion may be employed if the design of the quick-connect system does not facilitate structural and electrical engagement in one motion. The second engaging motion may also be rotational, along a straight path, or along a curved path.

The quick-connect system routine 400 may also include securing the coupling mechanism structurally to the electrical fixture using a threaded connection and/or a securing pin, and electrically connecting electrical fixture wiring of the electrical fixture to fixture power contacts of the coupling mechanism.

The quick-connect system routine 400 may also include performing a second engaging motion as part of the engaging action, where the first engaging motion moves the coupling mechanism along at least one of a straight path and a curved path such that the coupling mechanism is structurally engaged within the mounting mechanism, and where the second engaging motion moves the coupling mechanism rotationally within the mounting mechanism, thereby electrically engaging the at least two male coupling mechanism power contacts of the coupling mechanism with the at least two female coupling mechanism power contacts of the mounting mechanism.

The quick-connect system routine 400 may also include latching the coupling mechanism securely within the mounting mechanism via at least the first engaging motion, where latching includes engaging a coupling mechanism latching feature with a mounting mechanism latching feature, and where latching prevents vibration of the electrical fixture from structurally and electrically disengaging the coupling mechanism from the mounting mechanism by restricting motion of the coupling mechanism within the mounting mechanism.

The quick-connect system routine 400 may also include installing a coupling locking tab in the coupling gap, where the coupling locking tab may be an anti-rotation device that prevents the coupling mechanism from disengaging from the mounting mechanism by rotating out of a latched position traveling back out through the coupling gap. Other technical features may be readily apparent to one skilled in the art from the following figures, descriptions, and claims.

Figure 5:
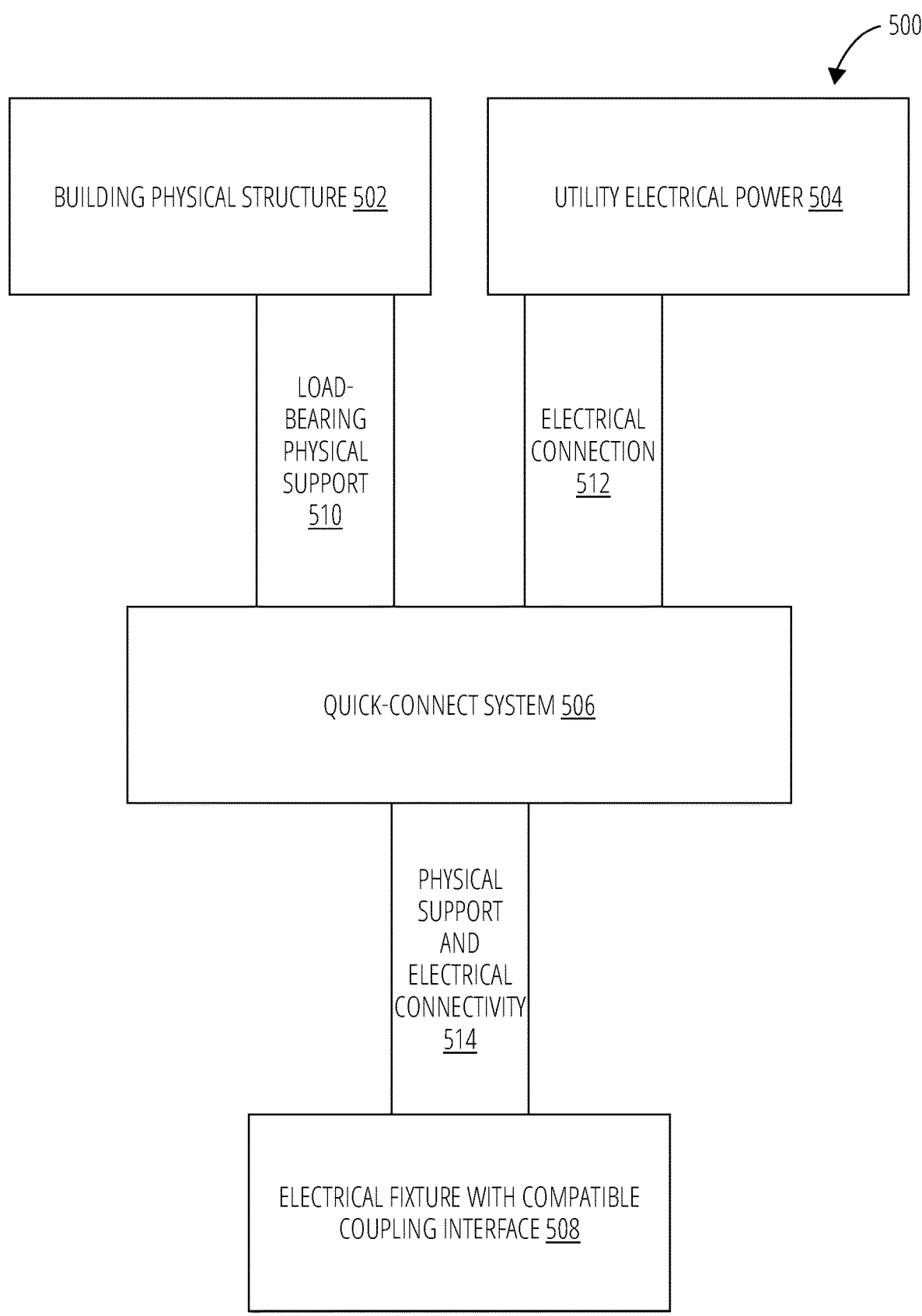
FIG. 5 illustrates a block diagram of a complete installation 500 in accordance with one embodiment.

FIG. 5 illustrates a block diagram of a complete installation 500 in accordance with one embodiment. The block diagram of a complete installation 500 comprises a building physical structure 502, utility electrical power 504, a quick-connect system 506, an electrical fixture with compatible coupling interface 508, a load-bearing physical support 510, an electrical connection 512, and a physical support and electrical connectivity 514. The solution disclosed herein improves on conventional installation methods for electrical fixtures that need structural support (e.g., ceiling fixtures) with a new type of electrical fixture mounting mechanism and coupling mechanism.

This new mounting mechanism of the quick-connect system 506 may combine the load-bearing physical support 510 capabilities for suspending a ceiling fixture with the electrical connection 512 to the building power source needed to power the fixture. The mounting mechanism may include permanent connections to the building physical structure 502 using traditional mechanical fasteners such as screws and nails. The mounting mechanism may further include permanent connections to utility electrical power 504 using traditional electrical connectors, such as wire nuts or screw terminals. Finally, the quick-connect system 506 may include a single, temporary connection to the electrical fixture with compatible coupling interface 508 through the coupling mechanism of the quick-connect system 506 that delivers both physical support and electrical connectivity 514 to the electrical fixture with compatible coupling interface 508 as illustrated in this figure.

Once the permanent connections between the fixture mounting mechanism and the building structure and power supply are made, a fixture with a complimentary fixture coupling may be connected to the mechanism quickly in a single action.

The mounting mechanism and fixture coupling may be constructed out of any material suitable for the intended structural load, including metal, composite plastic, polyvinyl chloride (PVC), acrylonitrile butadiene styrene (ABS), carbon fiber, hardened rubber, silicone, or wood. Electrical wires and leads incorporated into the mounting mechanism may be insulated from the mechanism by any non-conductive lining or layer. The insulating layer may be made from any non-conducting material including paper, glass, rubber, silicone, porcelain, ceramic, or plastic.

To deliver electrical service from the building electrical source to the fixture, the mounting mechanism includes electrical connections from the permanent electrical interface(s) that connect to the building electrical service to the temporary electrical interface to the fixture. The electrical connections in the mounting mechanism may be made from any electrically conductive material, including round copper wire, flat copper wire, metallic or electrically conductive laminate or coating, or semiconductor material such as silicon, germanium, or gallium arsenide.

The coupling mechanism may be attached to the fixture as an accessory (to upgrade a legacy or a non-compatible fixture) or may be incorporated into the ceiling fixture housing itself.

The fixture coupling serves as the connection point between the mounting mechanism and the fixture. The fixture coupling includes electrical and structural connections that attach to the mounting mechanism so that, when attached, the fixture is supplied with both electrical service and structural support.

The electrical connections in the fixture coupling connect to the fixture electrical elements via standard electrical wires, or via electrically conductive strips, laminates, or coatings. The electrical connections and leads may be made from any electrically conductive material, including round copper wire, flat copper wire, metallic or electrically conductive laminate or coating, or semiconductor material such as silicon, germanium, or gallium arsenide.

As with the mounting mechanism, the fixture coupling may be constructed out of any material suitable for the intended structural load, including metal, composite plastic, PVC, ABS, carbon fiber, hardened rubber, or wood. Electrical wires and leads incorporated into the fixture coupling may be insulated from the coupling by any non-conductive lining or layer. The insulating layer may be made from any non-conducting material including paper, glass, rubber, porcelain, ceramic, or plastic. The fixture mounting mechanism is also the mechanism that delivers the electrical service from the utility electrical power of the building or structure to the electrical fixture installed therein.

The coupling mechanism may either be attached to the fixture or incorporated into the ceiling fixture design. Using the new electrical fixture mounting mechanism and coupling mechanism, the improved process for installing a new ceiling fixture may be as follows:
1. Disconnect the electrical service to the appropriate circuit by opening the appropriate breaker at the electrical panel.
2. Permanently attach the new electrical fixture mounting mechanism to the ceiling joists above the finished ceiling using fasteners such as nails or wood screws. Alternatively, instead of connecting directly to the ceiling joists, the new electrical fixture mounting mechanism could be connected to a load-bearing ceiling junction box for a surface-mounted installation.
3. Permanently connect the building's electrical power source wires to the utility power contacts on the new electrical fixture mounting mechanism using wire nuts or other standard electrical connectors.
4. Lift the electrical fixture into place and connect the coupling mechanism on the electrical fixture to the fixture facing interface on the new mounting mechanism by aligning the coupling mechanism and turning the fixture to complete the attachment. This establishes both the structural support and electrical connections needed for the fixture to safely operate.
5. Return electrical service to the circuit by closing the appropriate breaker in the electrical panel.

Repairing or replacing the fixture in the future may be done in a single step: simply disconnect the fixture from the new electrical fixture mounting mechanism by turning and/or lifting the fixture so that its coupling mechanism disconnects from the new electrical fixture mounting mechanism.

When compared to the traditional method for installing a ceiling fixture, the new process may enable a new fixture to be installed from scratch in 15% less time, and takes five steps instead of six. Using the new method to replace an existing fixture may take 80% less time than using traditional methods.

The improvements in ease-of-use, physical accessibility, and time needed to install a new fixture when using the new mechanisms and new process open up a variety of new opportunities for homeowners, builders, fixture manufacturers, and commercial and residential building owners and property managers. For example:

Homeowners may use the new mechanism to retrofit existing ceiling boxes so that ceiling fixtures may be moved or replaced more frequently when needed. For example, a ceiling fan may be installed during the summer months and then easily replaced with a chandelier during the winter months.

By using the new mechanism in their new building construction projects, builders may offer more flexibility in ceiling fixture types to prospective buyers or offer fixture upgrades with minimal overhead for installation.

Residential property management firms may offer prospective new tenants, the opportunity to customize the lighting electrical fixtures in their new unit—either as an up-sell or as a loss leader to attract new tenants—without having to employ a professional electrician to complete the work.

Using the principles described in this disclosure, fixture manufacturers may differentiate their fixtures with a faster and easier installation process that is attractive to a wider audience of potential customers.

Using the principles described in this disclosure, fixture manufacturers may adopt a proprietary design for their fixture-to-ceiling connections so that once a customer installs their brand of mounting mechanism in their home, they will be incentivized to replace the fixture in the future with one from the same brand that also features their proprietary fixture-to-ceiling design making the installation process for a replacement fixture quick and easy.

Benefits of Disclosed Mounting Mechanisms

Easier initial installation
Fast and easy connect and disconnect of fixture
The weight of the fixture reinforces the integrity of the electrical connection
No need to cut the power to the circuit at the building electrical panel in order to uninstall or reinstall the fixture
Eliminates the need to suspend the fixture overhead while physical electrical connections are made Characteristics of Quick Connect Electrical Mechanism Fixture mechanism made of electrically insulating material like plastic
Fixture mechanism has electrical connections for hot, neutral, and ground incorporated into the mechanism itself
Utilizes three separate connection channels—one each for hot, neutral, and ground electrical connections.
Electrical connection surfaces are located on the top of the channels on the fixture mechanism and at the bottom of the channels on the fixture adapter so that the force of gravity reinforces the physical electrical connections.

The mounting mechanism may either replace a traditional metal electrical box that attaches to the ceiling joists or it may be secured to an existing electrical box and sit below the ceiling sheetrock. The ceiling box may have electrical posts to connect the hot, neutral, and ground wires.

The support channels of the ceiling box may have a metal lining on the top surface that connects to the hot, neutral, and ground posts.

The coupling mechanism that plugs into the mounting mechanism may have threads that also have a metal lining for hot, neutral, and ground, but the lining for the fixture threads may be along the bottom so that they meet up with the metal lining on the top of the threads on the ceiling box.

There may be channels that run along the outside of the mounting mechanism that house the wires that connect the electrical posts to the wire lining on the threads.

A set screw may be used as shown in some of the figures described below. This or some similar mechanism may be needed to prevent the fixture from wiggling loose and falling out.

The mounting mechanism differs from the design of the standard light bulb in the following ways:

1. The electrical connections may be recessed along the top edge of the threads, reducing the chance of an accidental shock from someone touching the inside of the mechanism and leveraging the force of gravity to reinforce the contact between the electrical connections.
2. This design may incorporate three electrical connections (hot, neutral, and ground) instead of just two (hot and neutral).

Figures 6A, 6B:
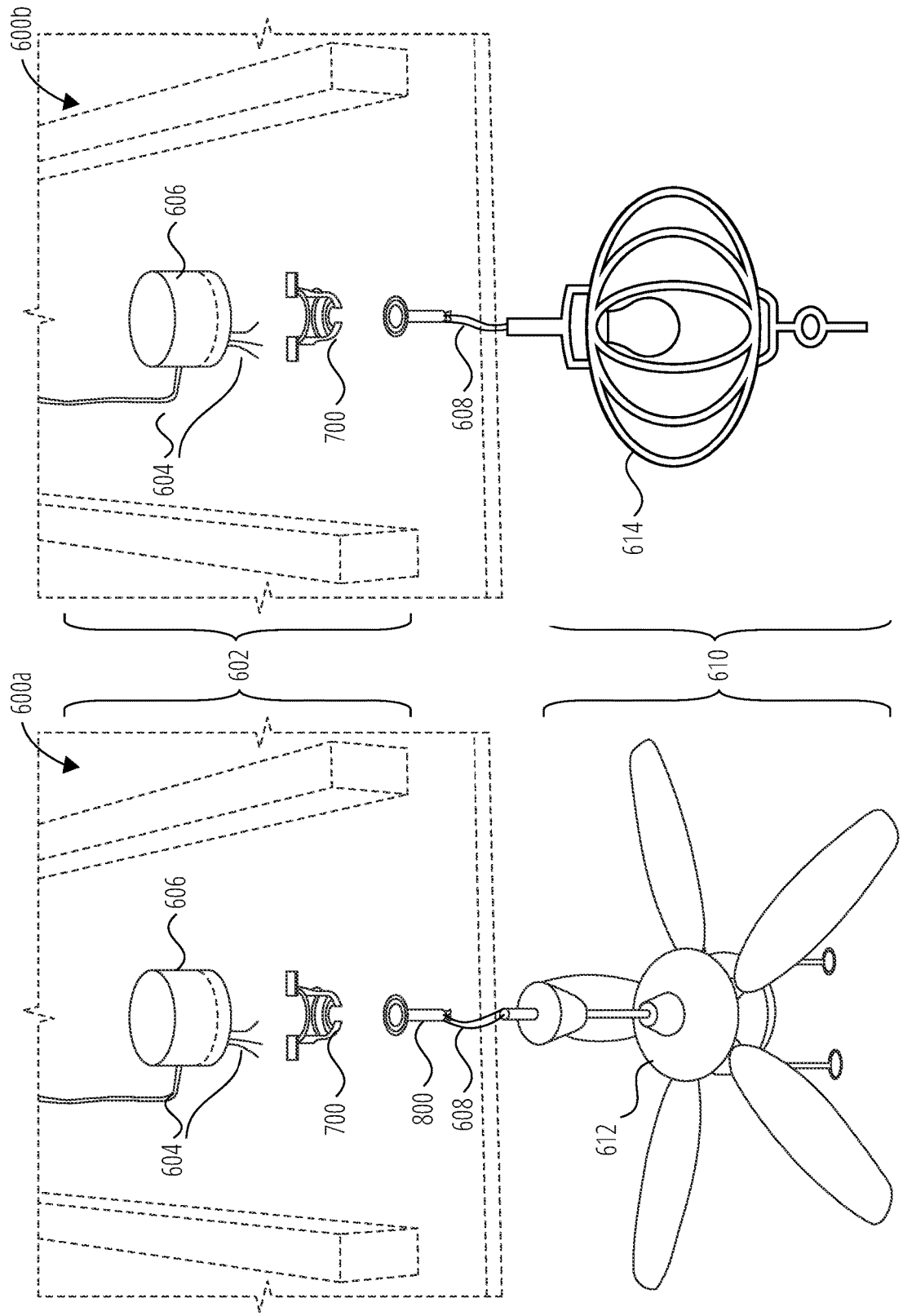
FIG. 6A illustrates a top exploded view of a complete assembly with ceiling fan electrical fixture 600a in accordance with one embodiment.
FIG. 6B illustrates a top exploded view of a complete assembly with lighting electrical fixture 600b in accordance with one embodiment.

FIG. 6A and FIG. 6B illustrate a top exploded view of a complete assembly with ceiling fan electrical fixture 600a and a top exploded view of a complete assembly with lighting electrical fixture 600b, respectively. Both a top exploded view of a complete assembly with ceiling fan electrical fixture 600a and a top exploded view of a complete assembly with lighting electrical fixture 600b comprise a ceiling support system 602, utility wiring 604, a conventional junction box 606, a mounting mechanism 700, a coupling mechanism 800, electrical fixture wiring 608, and an electrical fixture 610. In the top exploded view of a complete assembly with ceiling fan electrical fixture 600a the electrical fixture 610 illustrated is an exemplary ceiling fan electrical fixture 612. In the top exploded view of a complete assembly with lighting electrical fixture 600b, the electrical fixture 610 illustrated is an exemplary lighting electrical fixture 614.

Figure 23B:
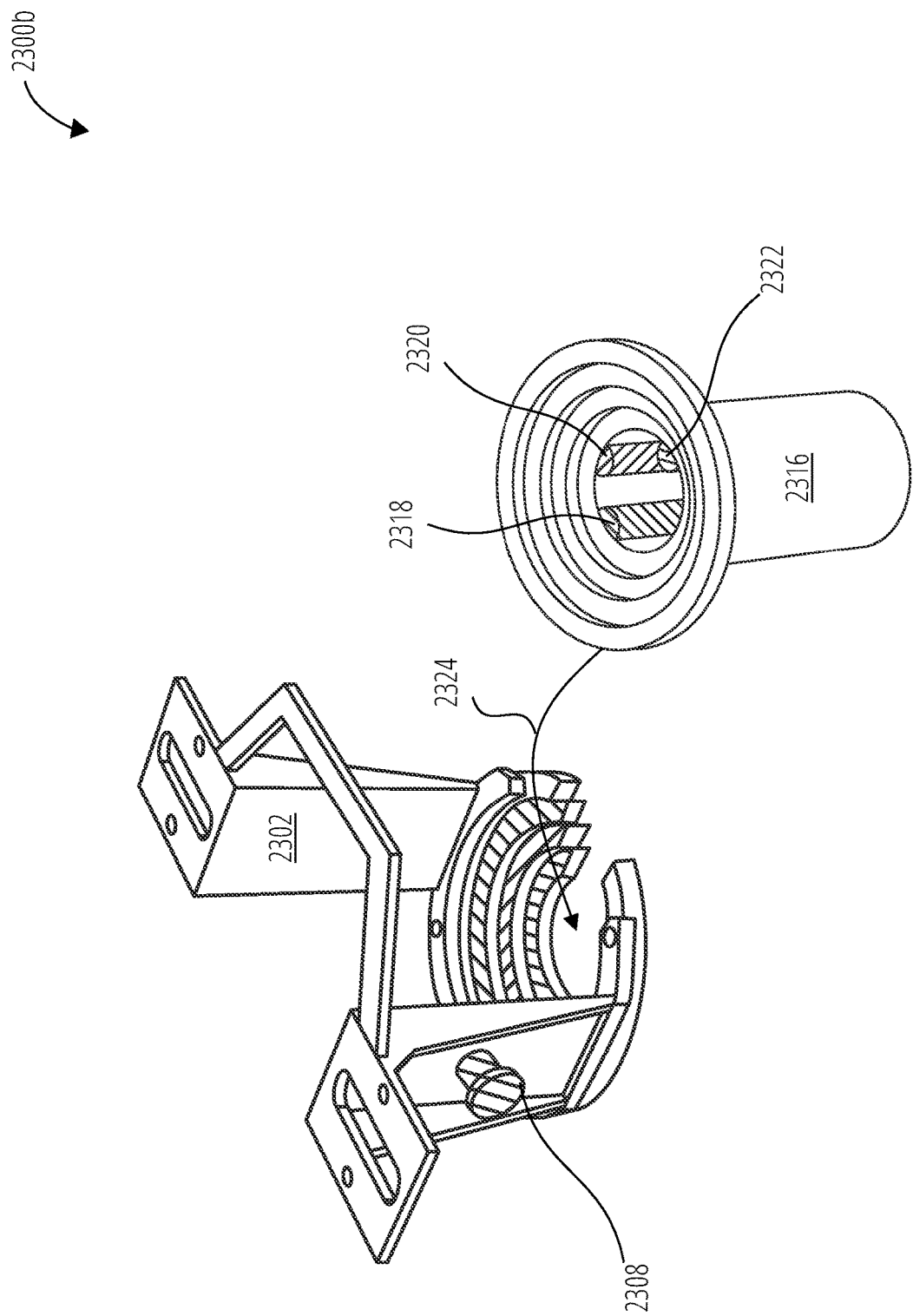
FIG. 23B illustrates a top, left view of the mounting mechanism and coupling mechanism 2300b in accordance with one embodiment.
Figure 23C:
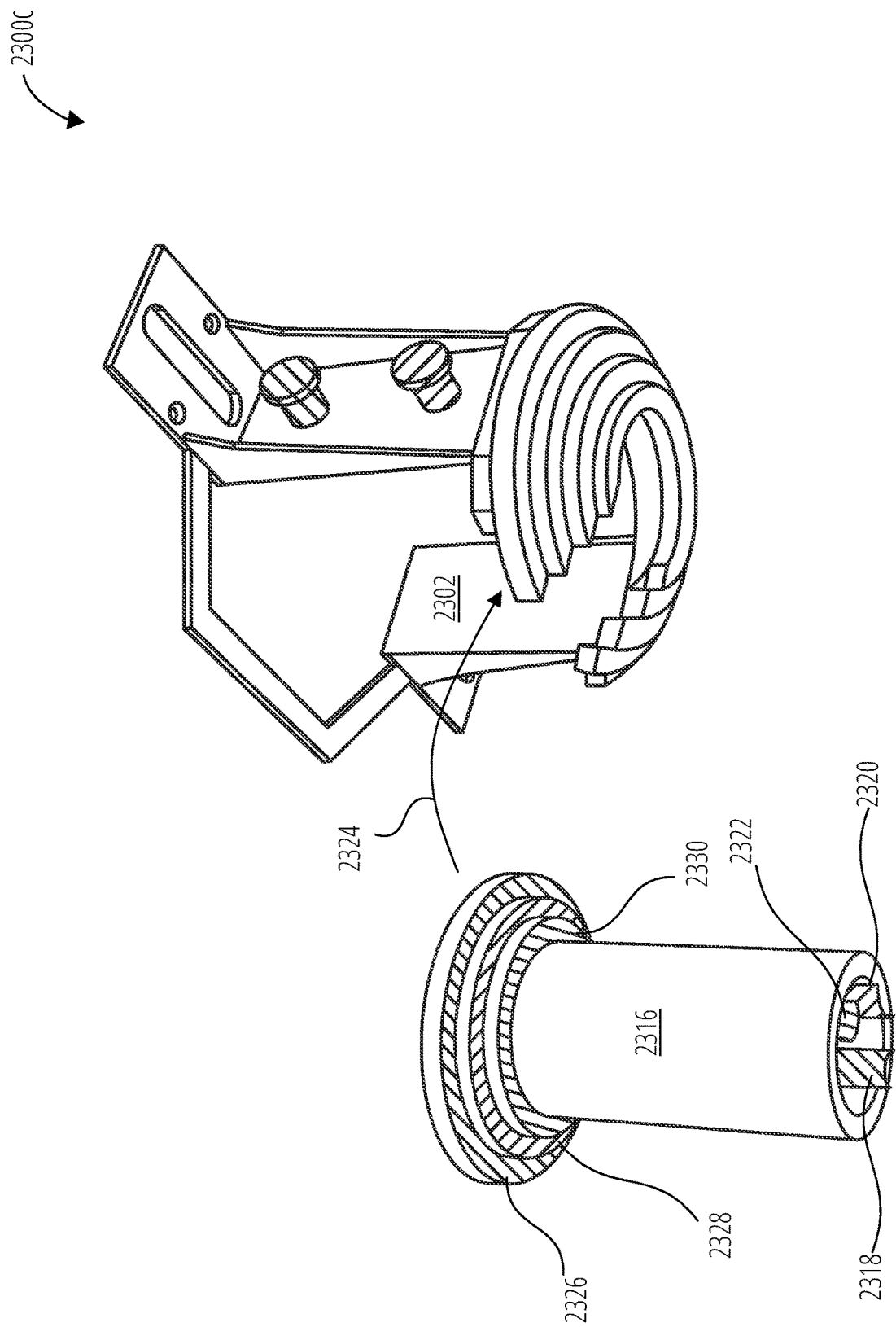
FIG. 23C illustrates a bottom, right view of the mounting mechanism and coupling mechanism 2300c in accordance with one embodiment.

The illustrated examples use the embodiments introduced in FIG. 23A-FIG. 23C to show how the electrical fixture mounting mechanism (or bracket) connects to a conventional ceiling fan junction box. The configurations illustrated in FIG. 6A and FIG. 6B are not intended to be limited in use by this illustration but may be used with any of the embodiments of the solution disclosed herein, as well as embodiments not disclosed but encompassed by the solution disclosed herein as will be well understood by those skilled in the art.

These figures show how the mounting mechanism 700 described herein is compatible with the conventional materials already used in building construction. Conventional construction includes a ceiling support system 602 comprising ceiling joists, a drywall ceiling, and a load-bearing conventional junction box 606 that is secured to the ceiling joists. The conventional junction box 606 houses the building electrical supply wires, which may comprise wires for hot, neutral, and ground electrical power signals.

The building electrical supply wires connect permanently to the utility power contacts of the mounting mechanism 700. The coupling mechanism 800 may be built into the design of the electrical fixture 610 downrod (shown here in a cutaway view) with electrical fixture wiring 608 running through the center of the downrod shaft to the fixture electrical components. In addition to being built into the fixture itself, the coupling could be implemented as a replacement downrod or a mounting mechanism/coupling mechanism assembly retrofit kit that allows for connection to ceiling fans or ceiling lighting fixtures available on the market.

Once the mounting mechanism 700 is connected to the ceiling conventional junction box 606 and the permanent electrical connections are made to the terminals on the mounting mechanism 700, installation of the electrical fixture 610 is as simple as lifting the electrical fixture 610 into place, aligning corresponding contacts of the mounting mechanism 700 with those of the coupling mechanism 800, and dropping the fixture into place. Optionally, the assembly may be further secured with a set screw or other device to restrict unwanted movement between the mounting mechanism 700 and coupling mechanism 800. Once the fixture is installed, a decorative canopy may be slid into place to cover the mechanism and coupling assembly.

FIG. 7A illustrates a mounting mechanism 700 in accordance with one embodiment. The mounting mechanism 700 may comprise a mounting mechanism housing 702, ceiling structural connection points 704, utility power contacts 706, one or more wire connectors 708, a coupling gap 710, female coupling mechanism power contacts 712 at the end of power contact tracks 714 having insertion ends 716 and terminal ends 718, coupling mechanism structural support 720, a mounting mechanism latching feature 722, a hole for a spring-loaded locking pin or set screw 724, external faces 726, and a wireless receiver gap 728.

The mounting mechanism housing 702 may be configured to receive and connect to a coupling mechanism (illustrated in FIG. 8) using the disclosed quick-connect system method. The mounting mechanism housing 702 may provide coupling mechanism structural support 720 as shown. In one embodiment, mounting mechanism electrical leads (illustrated in FIG. 13A) may be insulated within the mounting mechanism housing 702. These leads may run between the utility power contacts 706 and the female coupling mechanism power contact 712, such that building power may be provided through the mounting mechanism 700 to the coupling mechanism.

Ceiling structural connection points 704 may be configured to accept at least one fastener to provide mounting mechanism structural support between the mounting mechanism 700 and a ceiling support system, as illustrated in FIG. 6A and FIG. 6B. The mounting mechanism 700 may be constructed from PVC or other non-electrical conducting material suitable for seventy-five-pound fan and fixture loads.

Four utility power contacts 706 may be provided as shown. In one common configuration, two of the utility power contacts 706 may be connected to the hot power signal from the utility electrical power, such as the two right-most contacts labeled "H". One utility power contact 706 may be intended to connect the neutral power signal (indicated with an "N"), and one may connect to building ground ("G" as illustrated). These utility power contacts 706 may comprise wire connectors 708 as illustrated. In such a configuration, mating wire connectors may be attached to utility wiring (typically 12 or 14 American wire gauge wire), and connection to utility electrical power may then be made through seating the mating wire connectors into those comprised in the mounting mechanism 700. In another embodiment, the utility power contacts 706 may be screw terminals. In another embodiment, all of the utility power contacts 706 may be included in a single wire connector.

The mounting mechanism 700 may be configured with a coupling gap 710 in some embodiments. This coupling gap 710 may permit passage of the coupling mechanism into the mounting mechanism housing 702 of the mounting mechanism 700 for installation and structural and electrical engagement.

Female coupling mechanism power contact 712 may each be electrically connected to one of the utility power contacts 706. In one embodiment, this may be accomplished through mounting mechanism electrical leads (illustrated in FIG. 13A). In another embodiment, a single pass-through wire connector may connect utility power contacts 706 and female coupling mechanism power contact 712 within its connector housing. The female coupling mechanism power contact 712 may thus be connector pins, metal-plated contact pads, or take some other form as will be well understood in the art.

In one embodiment, the female coupling mechanism power contact 712 may be located at a terminal end 718 of a power contact track 714. In this manner, the male coupling mechanism power contacts of the coupling mechanism may be placed into the power contact tracks 714 at an insertion end 716, and may slide along the power contact tracks 714 as the engaging action is performed, as is described in additional detail with respect to FIG. 14A. This may make the coupling mechanism easier to install cleanly, improve the safety of the mounting mechanism 700, and reduce scratching and wear of the female coupling mechanism power contacts 712 due to the motion of the male coupling mechanism power contacts.

The mounting mechanism housing 702 or some other portion of the mounting mechanism 700 may incorporate a mounting mechanism latching feature 722. This mounting mechanism latching feature 722 may interface with a related coupling mechanism latching feature incorporated into the coupling mechanism such that, when the coupling mechanism is engaged within the mounting mechanism 700, the latching features interact to prevent vibration and rotational motion of the coupling mechanism within the mounting mechanism 700.

In one embodiment, a hole for a spring-loaded locking pin or set screw 724 may be provided as an alternative or in addition to the mounting mechanism latching feature 722. The hole for a spring-loaded locking pin or set screw 724 may also be provided in addition or as an alternative to a coupling locking tab illustrated in FIG. 10A and FIG. 10B. The hole for a spring-loaded locking pin or set screw 724 may provide the ability to secure the coupling mechanism within the mounting mechanism 700 using a set screw installed outside the mounting mechanism housing 702, or a spring-loaded locking pin installed on the coupling mechanism. Other configurations allowing locking to prevent rotation and linear movement of the coupling mechanism within the mounting mechanism 700 that would act to disengage the components of the quick-connect system may occur to those skilled in the art.

Figure 7B:
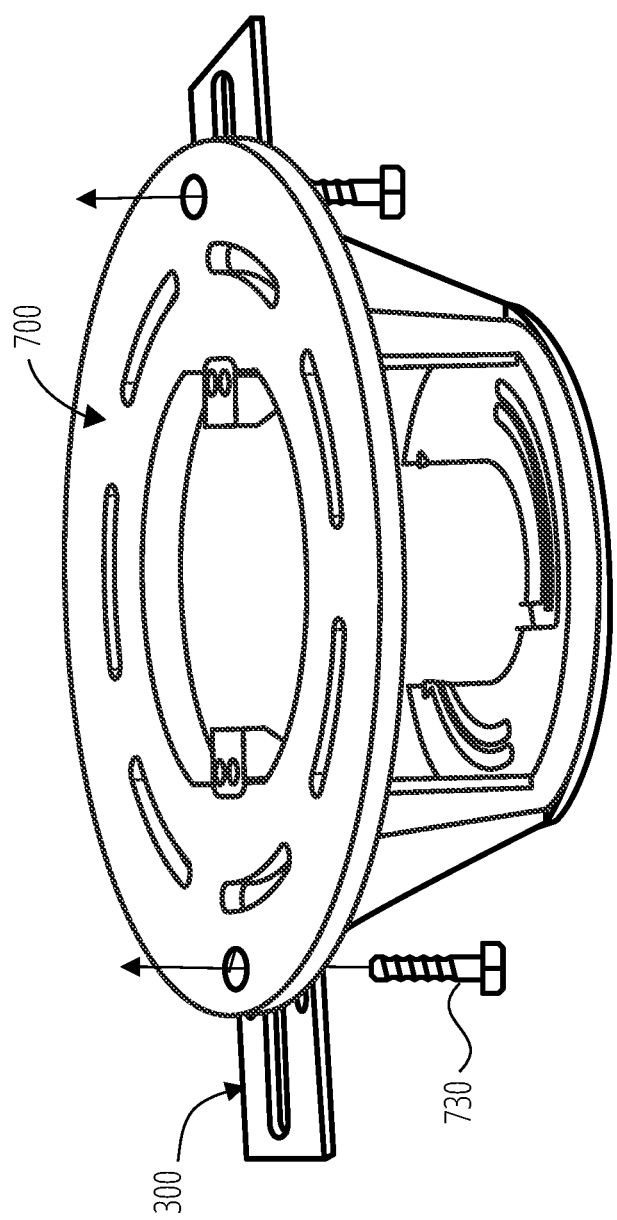
FIG. 7B illustrates a mounting mechanism 700 configured to fit within a fan bracket in accordance with one embodiment.

In one embodiment, external faces 726 of the mounting mechanism 700 may be configured to fit within a fan bracket such as the conventional fan bracket 300 illustrated in FIG. 3. Different versions of the mounting mechanism 700 may be sized, molded, carved, and otherwise formed such that they fit securely within the inner contours of specific fan bracket designs. The ceiling structural connection points 704 may be configured to align with fan bracket ceiling structural connection points, such that individual fasteners may pass through both a ceiling structural connection point 704 and a fan bracket ceiling structural connection point, securing both the fan bracket and the mounting mechanism 700 structurally to the ceiling support system. On embodiment of a mounting mechanism 700 configured to sit within a conventional fan bracket 300 may be seen in FIG. 7B.

In an embodiment where the mounting mechanism 700 is a liner within a traditional fan bracket, there is no load-bearing capability needed, and the mounting mechanism 700 may be constructed using a low-cost, non-load-bearing material such as silicone. The flange on the mounting mechanism 700 shown in FIG. 7A and FIG. 7B, including the ceiling structural connection points 704, may not be present in embodiments configured to fit within fan brackets. Connection points elsewhere in the mounting mechanism 700 may secure the mounting mechanism 700 to the fan bracket to prevent rotation and provide a stable and stationary mounting mechanism 700 that a coupling mechanism 800 may be securely engaged with.

The mounting mechanism 700 may in one embodiment be configured with a wireless receiver gap 728, such that, with a coupling mechanism engaged within the mounting mechanism 700, there remains sufficient vertical and horizontal space to insert a wireless receiver intended to control the behavior of the installed electrical fixture.

FIG. 8 illustrates a coupling mechanism 800 in accordance with one embodiment. The coupling mechanism 800 comprises a coupling mechanism housing 802, male coupling mechanism power contacts 804, fixture power contacts 806, a coupling mechanism latching feature 808, a hole for a securing pin 810, screw terminals 812, a threaded connection 814, and, in some embodiments, a spring-loaded locking pin 816.

The coupling mechanism housing 802 may be configured to connect to and receive structural support from the mounting mechanism housing 702 using the quick-connect system. The coupling mechanism housing 802 may provide electrical fixture structural support and may insulate coupling mechanism electrical leads 1304, illustrated in FIG. 13B. The coupling mechanism 800 may be constructed from PVC or other non-electrical conducting material suitable for seventy-five-pound fan and fixture loads.

The male coupling mechanism power contact 804 may be configured to electrically connect to the female coupling mechanism power contacts 712 of the mounting mechanism 700 using the quick-connect system. The fixture power contacts 806 may each be electrically connected to the male coupling mechanism power contacts 804 by the coupling mechanism electrical leads 1304. In this manner, fixture electrical leads of an electrical fixture may receive utility electrical power through connection with the fixture power contacts 806. As described for the power contacts and terminals of the mounting mechanism 700, the fixture power contact 806 may be screw terminals 812 or some other wire terminals as are well understood in the art. In one embodiment, these are left exposed for after-market installation on an electrical fixture at the installation site. In another embodiment, these may be integrated into the electrical fixture at the time of manufacture and may be covered by a hood or housing, preventing damage to the wire connections. Further, the male coupling mechanism power contacts 804 may be included in one or more wire connectors or may be metal-plated cylindrical structures, as indicated in this figure. These exemplary contact constructions are not intended to be limiting, and variations will easily suggest themselves to those skilled in the art.

The coupling mechanism 800 may be configured with a threaded connection 814 configured to mate with an electrical fixture threaded connection, thereby preventing separation of the coupling mechanism 800 and the electrical fixture and providing electrical fixture structural support. In one embodiment, the coupling mechanism 800 may be further configured with a hole for a securing pin 810, which may align with a similar hole on the electrical fixture when the two are coupled, allowing the insertion of a securing pin that provides additional electrical fixture structural support and prevents the threaded connection 814 between the 800 and the electrical fixture from disengaging due to motion of the electrical fixture when powered on.

In one embodiment, the coupling mechanism 800 may include a spring-loaded locking pin 816, wherein the spring-loaded locking pin 816 is configured to prevent the coupling mechanism 800 from traveling out of the mounting mechanism 700 by engaging with the hole for a spring-loaded locking pin or set screw 724 illustrated in FIG. 7A. In one embodiment, the coupling mechanism 800 may have a hole, dimple, or other recess in place of the spring-loaded locking pin 816 to accommodate a set screw configuration, configured to prevent the coupling mechanism 800 from traveling out of the mounting mechanism 700 when the two are engaged and the set screw is set.

Figure 9:
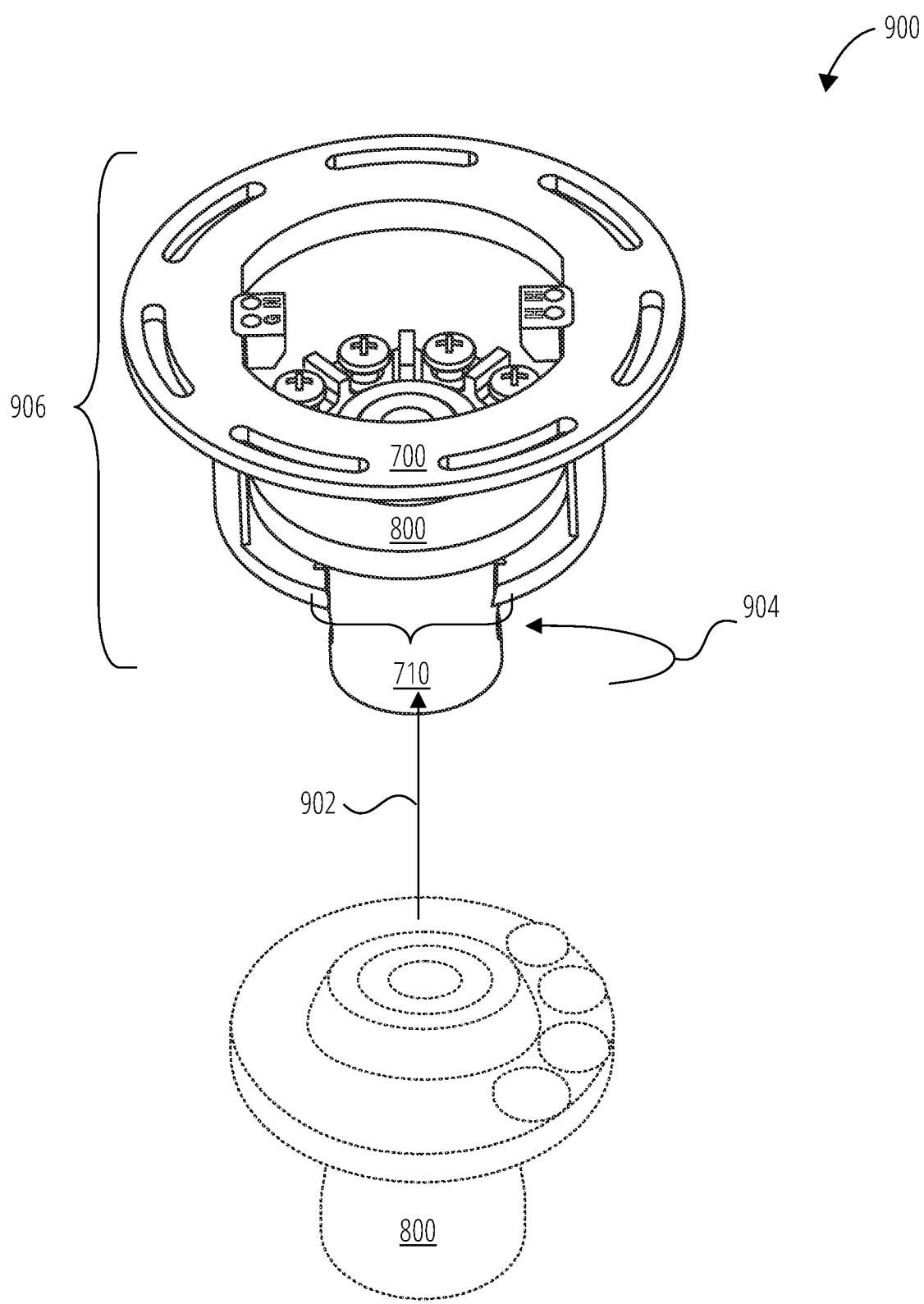
FIG. 9 illustrates quick-connect system engaging actions 900 in accordance with one embodiment.

FIG. 9 illustrates quick-connect system engaging actions 900 in accordance with one embodiment. The quick-connect system engaging actions 900 may comprise a first engaging motion 902 and, in some embodiments, a second engaging motion 904, resulting in the coupling mechanism seated in mounting mechanism 906.

As illustrated, the first engaging motion 902 may in some embodiments be a linear motion of the coupling mechanism 800 through the coupling gap 710 of the mounting mechanism 700, such that the coupling mechanism 800 resides within the mounting mechanism housing 702. This first engaging motion 902 may place the male coupling mechanism power contacts 804 at the insertion ends 716 of the power contact tracks 714, as previously described, and may place the coupling mechanism latching feature 808 in a position to begin engaging with the mounting mechanism latching feature 722.

In some embodiments, this first engaging motion 902 may be all that is needed to fully engage the male coupling mechanism power contacts 804 of the coupling mechanism 800 with the female coupling mechanism power contacts 712 of the mounting mechanism 700. Such configurations are described below. The force of gravity may be sufficient to reinforce electrical coupling between the two components, as well as induce structural support of the coupling mechanism 800 by the mounting mechanism 700. Once the first engaging motion 902 is completed, the coupling gap 710 may be configured to be unobstructed by the coupling mechanism 800, such that a coupling locking tab may be installed to lock the coupling mechanism 800 within the mounting mechanism 700.

In other embodiments, a second engaging motion 904 may be needed to completely seat and engage the coupling mechanism 800 within the mounting mechanism 700. The second engaging motion 904 may be a counter-clockwise rotation, as illustrated. This second engaging motion 904 may induce the male coupling mechanism power contacts 804 to travel along the power contact tracks 714 of the mounting mechanism 700 until reaching the terminal ends 718 of the power contact tracks 714, where the male coupling mechanism power contacts 804 may engage with the female coupling mechanism power contacts 712. The second engaging motion 904 may also fully engage or seat the coupling mechanism latching feature 808 with the mounting mechanism latching feature 722. At this point, a hole for a spring-loaded locking pin or set screw 724 of the mounting mechanism 700 may be aligned to allow a set screw or a spring-loaded locking pin 816 of the coupling mechanism 800 to pass through, allowing additional securement of the coupling mechanism 800 within the mounting mechanism 700.

Figure 10A:
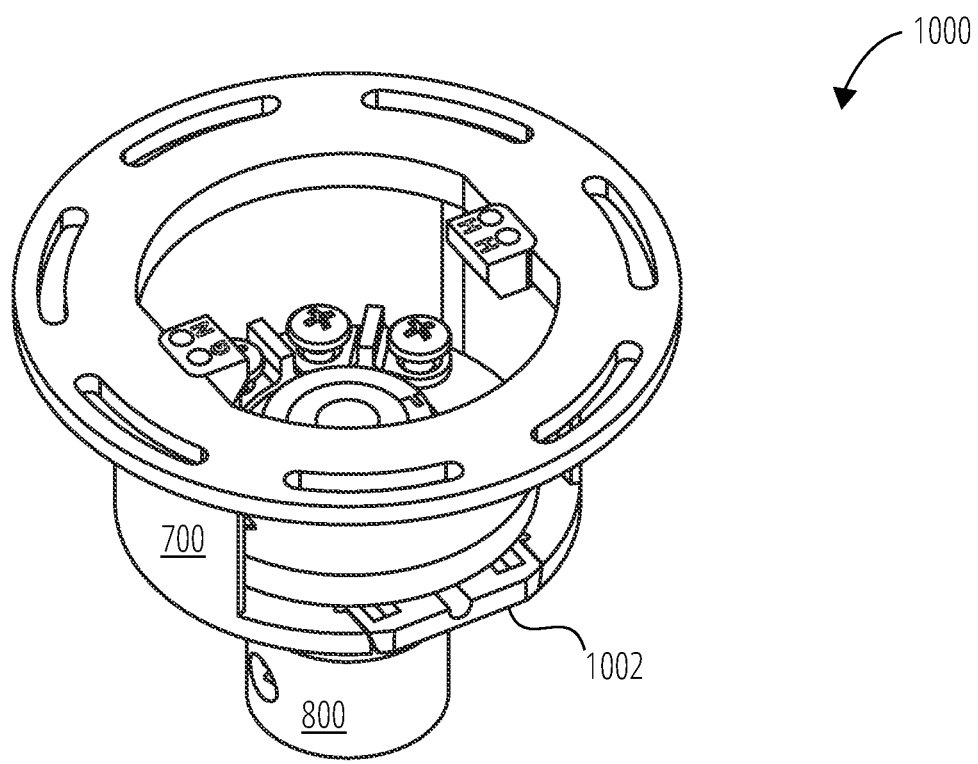
FIG. 10A and FIG. 10B illustrate a top and a bottom view of a quick-connect system with a locking feature installed 1000 in accordance with one embodiment.
Figure 10B:
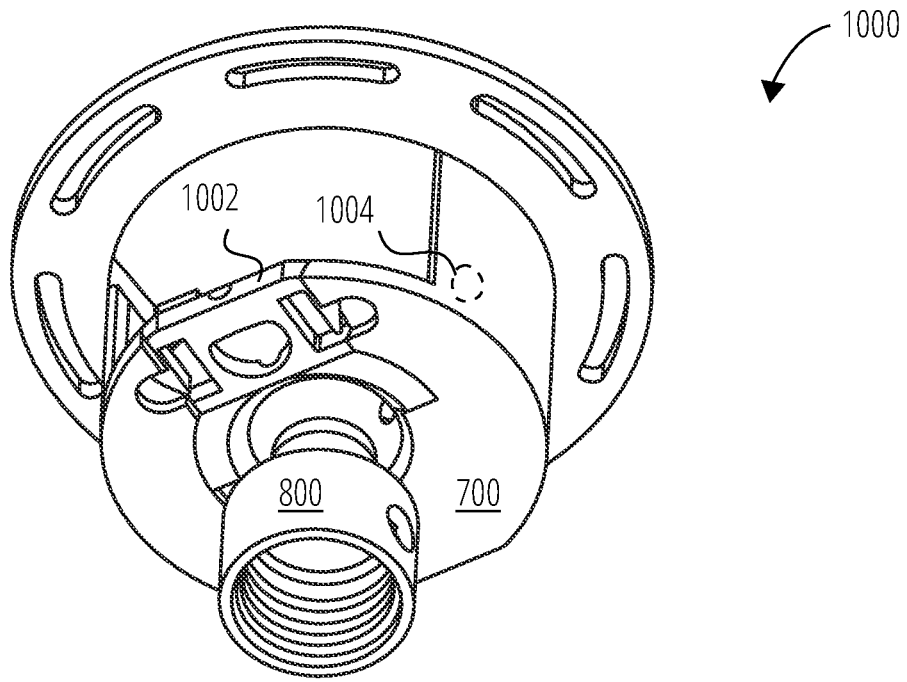

FIG. 10A and FIG. 10B illustrate a quick-connect system with a locking feature installed 1000 and a quick-connect system with a locking feature installed 1000 respectively, in accordance with one embodiment. The mounting mechanism 700 may be configured with a coupling gap 710 as previously described. The coupling gap 710 may be configured to be clear once the coupling mechanism 800 is fully seated within the mounting mechanism 700, leaving room for a coupling locking tab 1002 to be installed. The coupling locking tab 1002 may prevent the coupling mechanism 800 from disengaging from the mounting mechanism 700 by traveling back out through the coupling gap 710 due to the vibrational or rotational motion of the electrical fixture when powered on.

Figure 11:
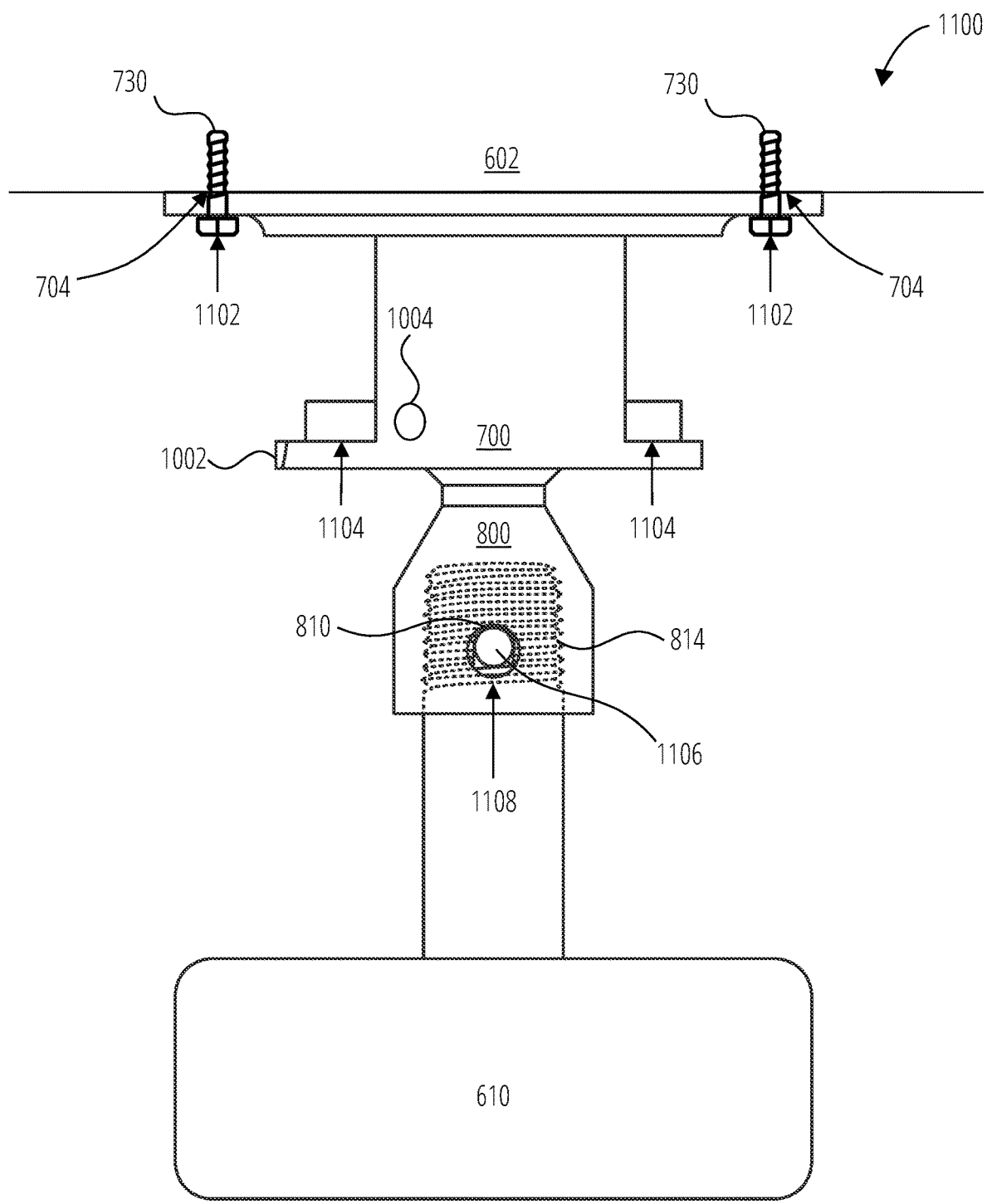
FIG. 11 illustrates quick-connect system structural connections 1100 in accordance with one embodiment.

FIG. 11 illustrates quick-connect system structural connections 1100 in accordance with one embodiment. The quick-connect system structural connections 1100 comprise a ceiling support system 602, an electrical fixture 610, a mounting mechanism 700, a ceiling structural connection point 704, a coupling mechanism 800, holes for a securing pin 810, a threaded connection 814, a coupling locking tab 1002, a set screw or spring-loaded locking pin 1004, a fastener 730, mounting mechanism structural support 1102, coupling mechanism structural support 1104, a securing pin 1106, and electrical fixture structural support 1108.

Fasteners 730 may pass through the ceiling structural connection points 704 of the mounting mechanism 700 and into the ceiling support system 602, anchoring the mounting mechanism 700 securely against a ceiling and providing mounting mechanism structural support 1102. These fasteners may be nails, wood, metal, or drywall screws, bolted connections, or any other type of fastener 730 configured to secure components having the combined weight of the mounting mechanism 700, the coupling mechanism 800, and the electrical fixture 610, to the material of the ceiling support system 602 to which the mounting mechanism 700 is to be anchored. For example, wood screws or nails may be used to secure the mounting mechanism 700 to a ceiling joist comprising a wooden beam. Metal screws or bolting may secure the mounting mechanism 700 to a preconfigured junction box. Anchors positioned appropriately in the drywall comprising the ceiling may not typically be the sole type of connection used, but may provide additional securement or support.

In turn, the mounting mechanism 700 may be configured with a housing shaped to provide coupling mechanism structural support 1104 to the coupling mechanism 800 when it is fully engaged within the mounting mechanism 700, as shown. A coupling locking tab 1002 and/or a set screw or spring-loaded locking pin 1004 may be used in some embodiments to provide additional structural security to the mounting mechanism 700 and coupling mechanism 800 pair when engaged.

The coupling mechanism 800 may be configured with a threaded connection 814 designed to engaged threading on a downrod or other portion of the electrical fixture 610. The electrical fixture structural support 1108 provided by the engagement of this threaded connection 814 between the 800 and the electrical fixture 610 may in some embodiments be reinforced by holes for a securing pin 810 located both in the coupling mechanism 800 and in the downrod or other portion of the electrical fixture 610, such that when they are aligned, a securing pin 1106 may be installed as shown. In addition to providing additional electrical fixture structural support 1108, the installation of a securing pin 1106 may prevent vibration and rotation motion induced by the electrical fixture 610 from weakening, wearing, or undoing the threaded connection 814. Those skilled in the art will easily envisage other analogous configurations for securement and support not illustrated here.

Figure 12A:
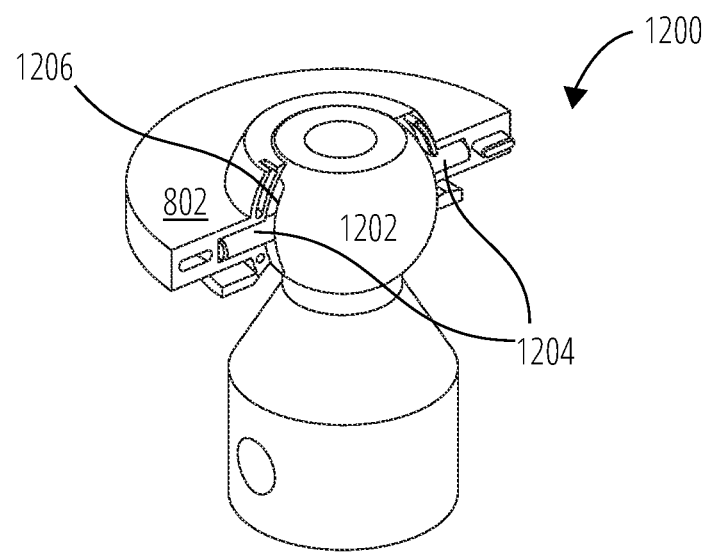
FIG. 12A and FIG. 12B illustrate a coupling mechanism configured with an angle-mount joint 1200 in accordance with one embodiment.
Figure 12B:
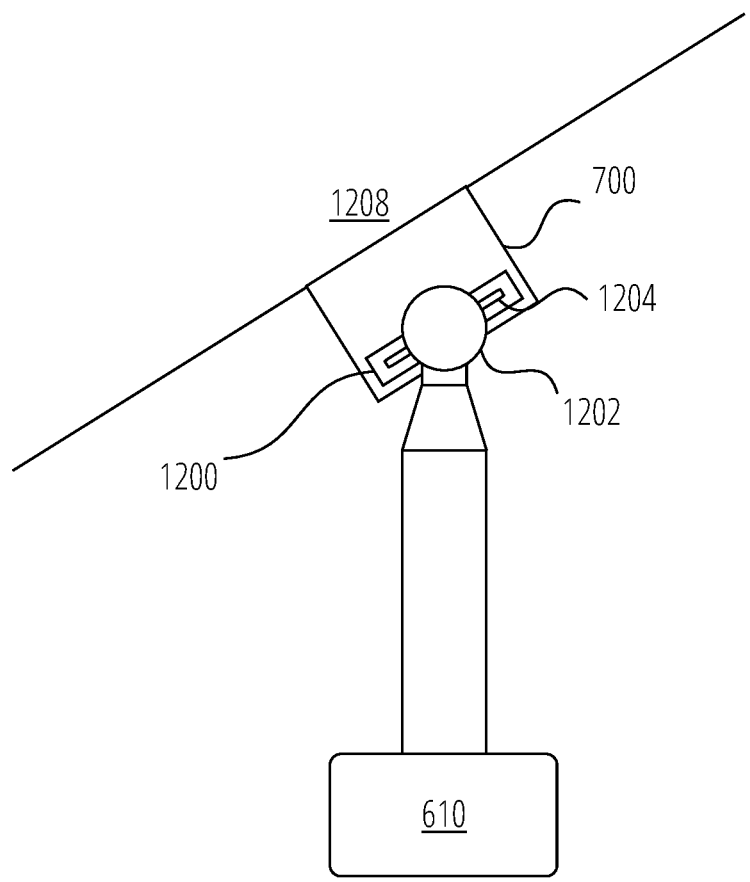

Not all ceiling-mounted electrical fixtures are intended for installation in ceilings that run parallel to a floor and perpendicular to the walls of the room in which the fixture is installed. Some ceilings are pitched or arched, necessitating a configuration of the quick-connect system that allows the coupling mechanism 800 to connect an electrical fixture to a mounting mechanism 700 mounted at an angle other than ninety degrees from the angled ceiling, i.e., an angle that is not square to the pull of gravity and thus the hanging orientation of the electrical fixture. FIG. 12A and FIG. 12B illustrate a coupling mechanism configured with an angle-mount joint 1200 to accommodate such installations.

For the coupling mechanism configured with an angle-mount joint 1200 illustrated, the angle-mount joint comprises a ball joint 1202 secured within the coupling mechanism housing 802 with joint pivot pins 1204. The joint pivot pins 1204 may be anchored securely within the coupling mechanism housing 802 as shown but may be able to slide along a vertical plane within joint pivot pin slots 1206 with which the ball joint 1202 is configured.

The degree of movement within the joint pivot pin slots 1206 may allow the joint pivot pins 1204 to secure the ball joint 1202 within the coupling mechanism housing 802 such that an electrical fixture 610 coupled to the coupling mechanism 800 is structurally supported, while still allowing rotation of the ball joint 1202 within the coupling mechanism housing 802, such that an electrical fixture 610 may hang true to vertical when installed into a mounting mechanism 700 mounted to an angled ceiling 1208, as shown.

Figure 13A:
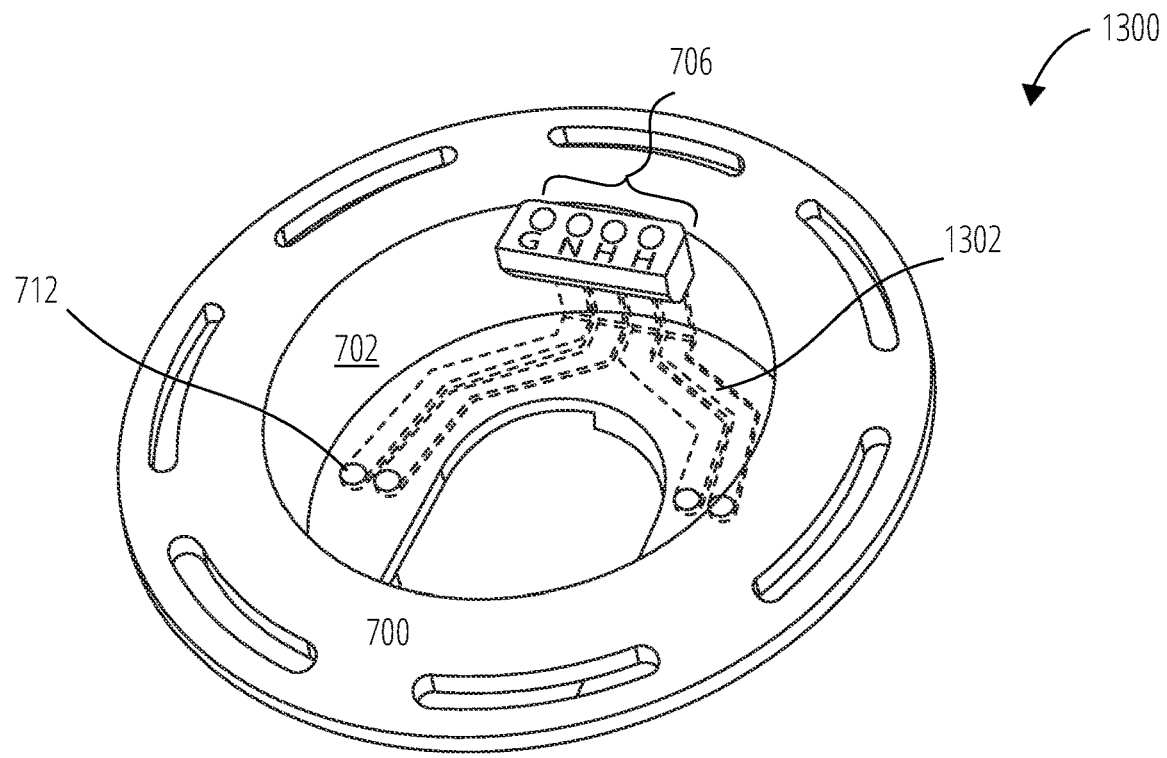
FIG. 13A-FIG. 13C illustrate quick-connect system electrical connections 1300 in accordance with one embodiment.
Figure 13B:
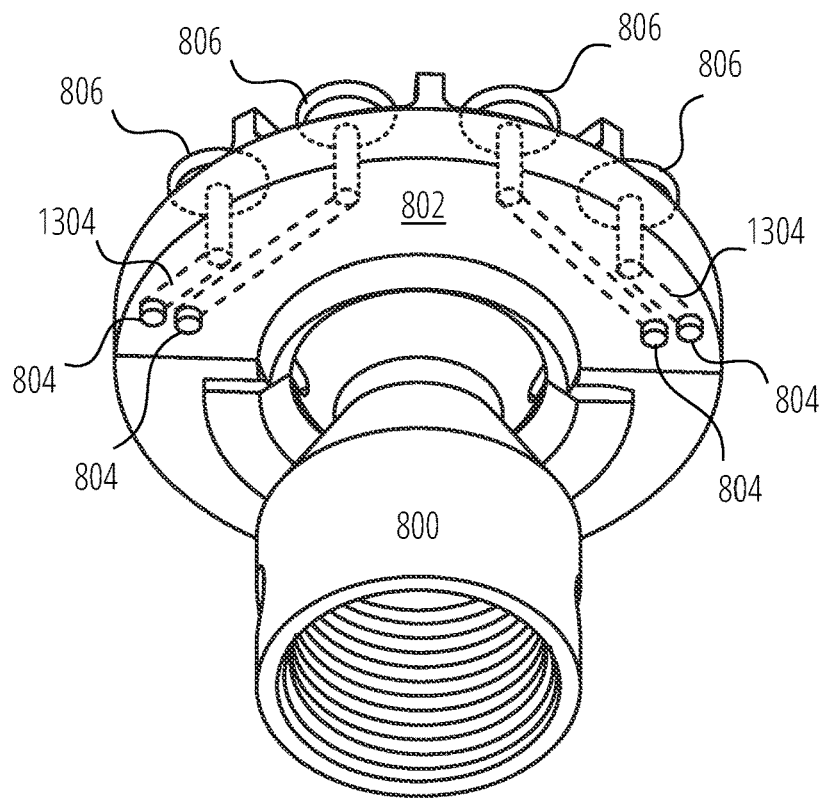
Figure 13C:
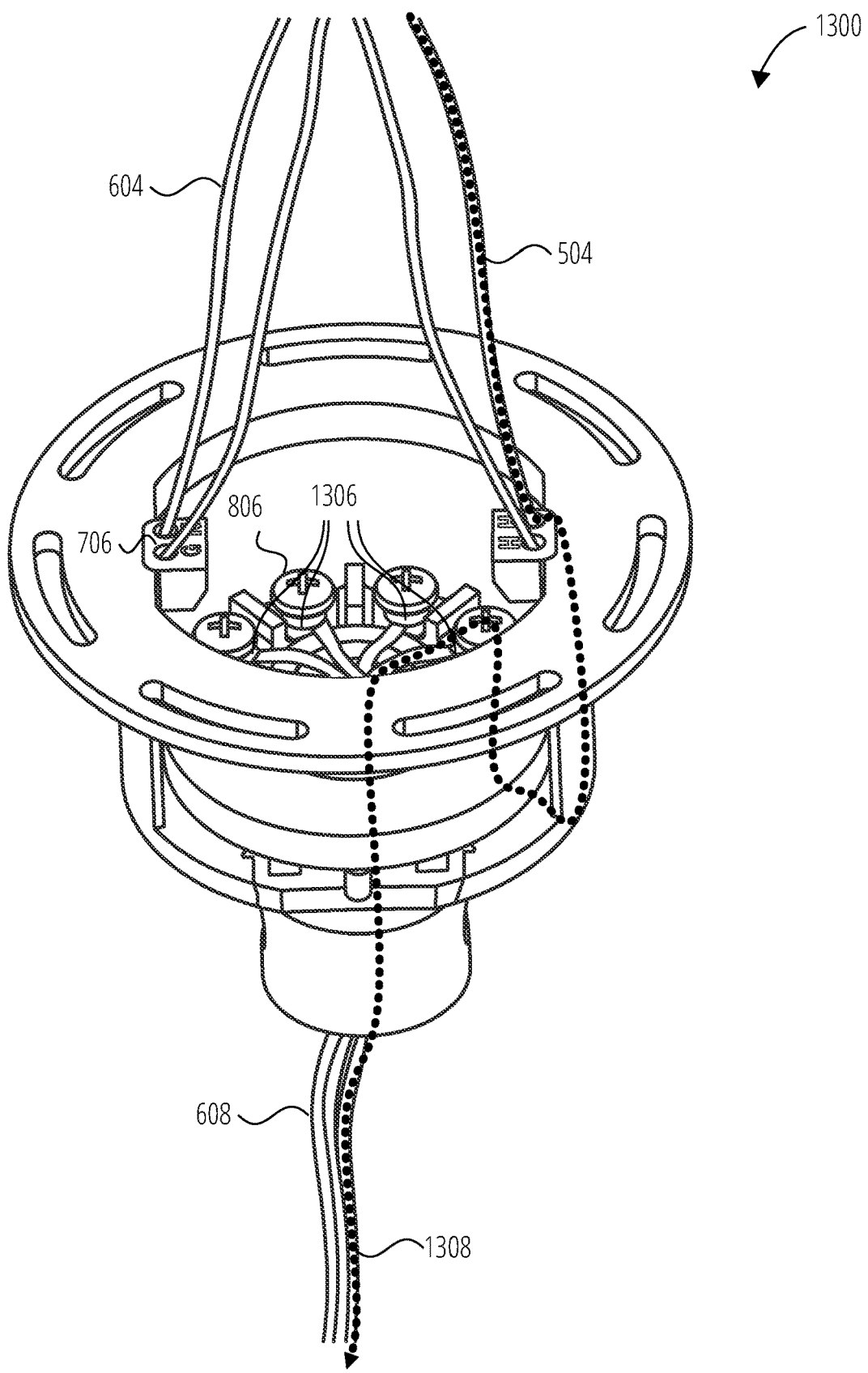

FIG. 13A-FIG. 13C illustrate quick-connect system electrical connections 1300 in accordance with one embodiment. The quick-connect system electrical connections 1300 may comprise the utility power contacts 706, mounting mechanism electrical leads 1302, and female coupling mechanism power contacts 712 of the mounting mechanism 700, illustrated in FIG. 13A, and the male coupling mechanism power contacts 804, coupling mechanism electrical leads 1304, and fixture power contacts 806 of the coupling mechanism 800, illustrated in FIG. 13B. The electrical leads may in some embodiments be copper electrical strips or wiring that runs inside the sidewalls of the mounting mechanism housing 702 and coupling mechanism housing 802, terminating at the various contacts previously described, thus remaining electrically insulated and physically protected against shorts and damage.

In FIG. 13C the flow of power from utility electrical power 504 to power to electrical fixture 1308 may be seen. In the illustrated embodiment, two hot building power signal connections are shown, along with one neutral and one ground power signal connection. Hot building power may be said to flow to the electrical fixture along the wires carrying the hot building power signal, with return power flowing back through a wire connected to a neutral building power signal. However, for simplicity of illustration, the path is traced along one hot wire.

Utility electrical power 504 may flow along utility wiring 604 to the utility power contacts 706 of the mounting mechanism 700, and from thence through mounting mechanism electrical leads 1302 to the female coupling mechanism power contacts 712, both shown in FIG. 13A though not visible in FIG. 13C. Through the connection of these female coupling mechanism power contacts 712 with the male coupling mechanism power contacts 804, and the path from the male coupling mechanism power contact 804 to the fixture power contacts 806 through the coupling mechanism electrical leads 1304 (shown in FIG. 13B), power flows through the quick-connect system to the fixture electrical leads 1306 connected to the fixture power contacts 806.

The fixture electrical leads 1306 connect the electrical fixture wiring 608 to the fixture power contacts 806. In this manner, power to the electrical fixture may be delivered from utility wiring 604 to electrical fixture wiring 608 through the quick-connect system.

Figure 14A:
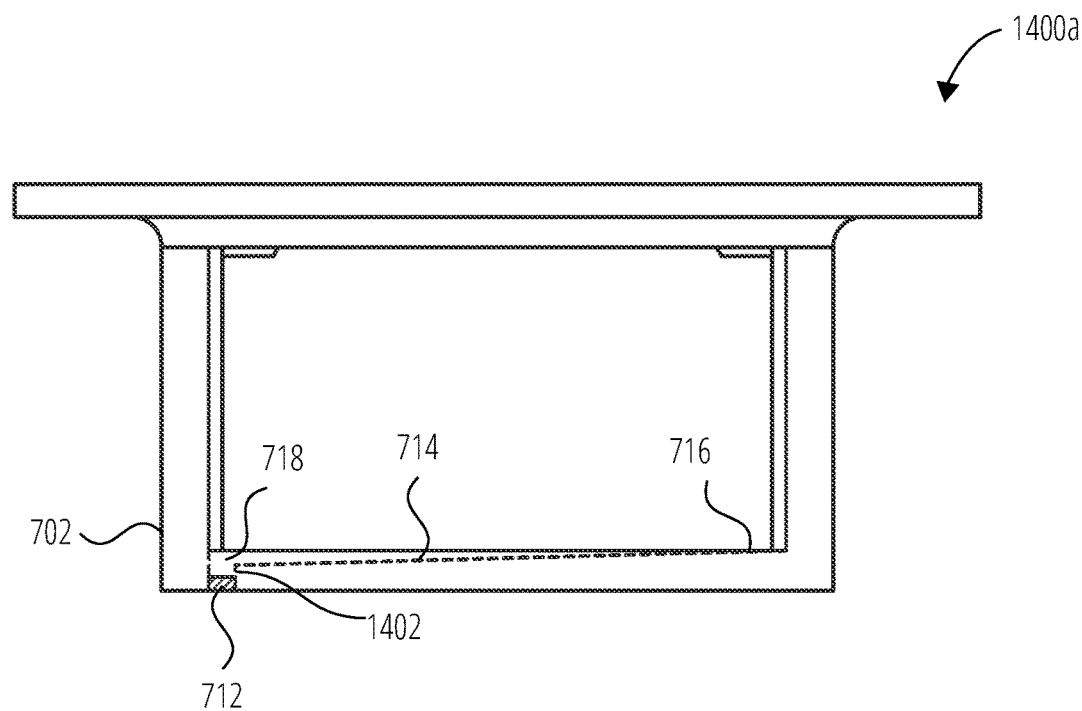
FIG. 14A illustrates a mounting mechanism cutaway side view 1400a in accordance with one embodiment.
Figure 14B:
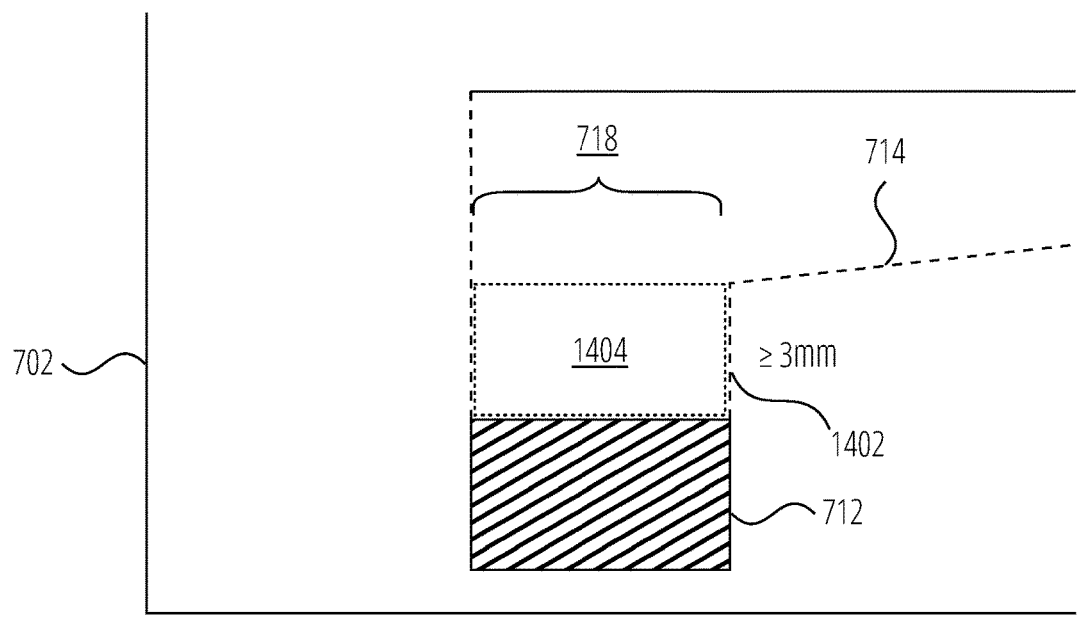
FIG. 14B illustrates a mounting mechanism cutaway side view terminal end close up 1400b in accordance with one embodiment.

FIG. 14A and FIG. 14B illustrate a mounting mechanism cutaway side view 1400a and a mounting mechanism cutaway side view terminal end close up 1400b, respectively. The mounting mechanism cutaway side view 1400a and mounting mechanism cutaway side view terminal end close up 1400b display a configuration of power contact tracks 714 having female coupling mechanism power contacts 712 at their terminal ends 718, as introduced with regard to FIG. 7A, in accordance with one embodiment.

The power contact tracks 714 may be such as are described with respect to FIG. 7A above. The male coupling mechanism power contacts 804 of the coupling mechanism 800 may slide along the power contact tracks 714 from their insertion at the insertion ends 716 to the female coupling mechanism power contacts 712 located at the terminal ends 718.

In addition, as illustrated here the power contact tracks 714 may be configured with a contact recess drop-off 1402. This contact recess drop-off 1402 may be of a dimension to meet industry safety regulations preventing contacts carrying live power signals from being easily touched or otherwise contacted by a person performing installation or de-installation. For example, in order to meet Underwriters' Laboratories (UL) standards, the contact recess drop-off 1402 may provide a vertical gap of 3 millimeters between the female coupling mechanism power contact 712 and the portion of the mounting mechanism housing 702 accessible to be touched by an installer.

Along with integrating a safety clearance into the design for the female coupling mechanism power contacts 712, which may in some installation cases be connected to live utility electrical power, the contact recess drop-offs 1402 may provide other enhancements to the quick-connect system. The wall of the contact recess drop-off 1402 may form the male coupling mechanism power contact recess 1404, where the male coupling mechanism power contacts 804 may fit securely when the coupling mechanism 800 is fully engaged with the mounting mechanism 700. Seating the male coupling mechanism power contacts within the narrower footprint of the male coupling mechanism power contact recess 1404, established by the vertical wall of the contact recess drop-off 1402 and the terminal end 718 of the power contact track 714 may prevent vibration of the male coupling mechanism power contacts against the female coupling mechanism power contact 712, thereby reducing wear on those contacts that might otherwise occur due to vibration of the electrical fixture. The drop of the male coupling mechanism power contacts into this engaged state may also provide a tactile response that may be sensed by the installer as a physical and/or audible "click", providing feedback confirming that the coupling mechanism 800 is appropriately seated within the mounting mechanism 700. Finally, the male coupling mechanism power contact may be held electrically connected to the female coupling mechanism power contact through force of weight of the electrical fixture and coupling mechanism.

Figure 15:
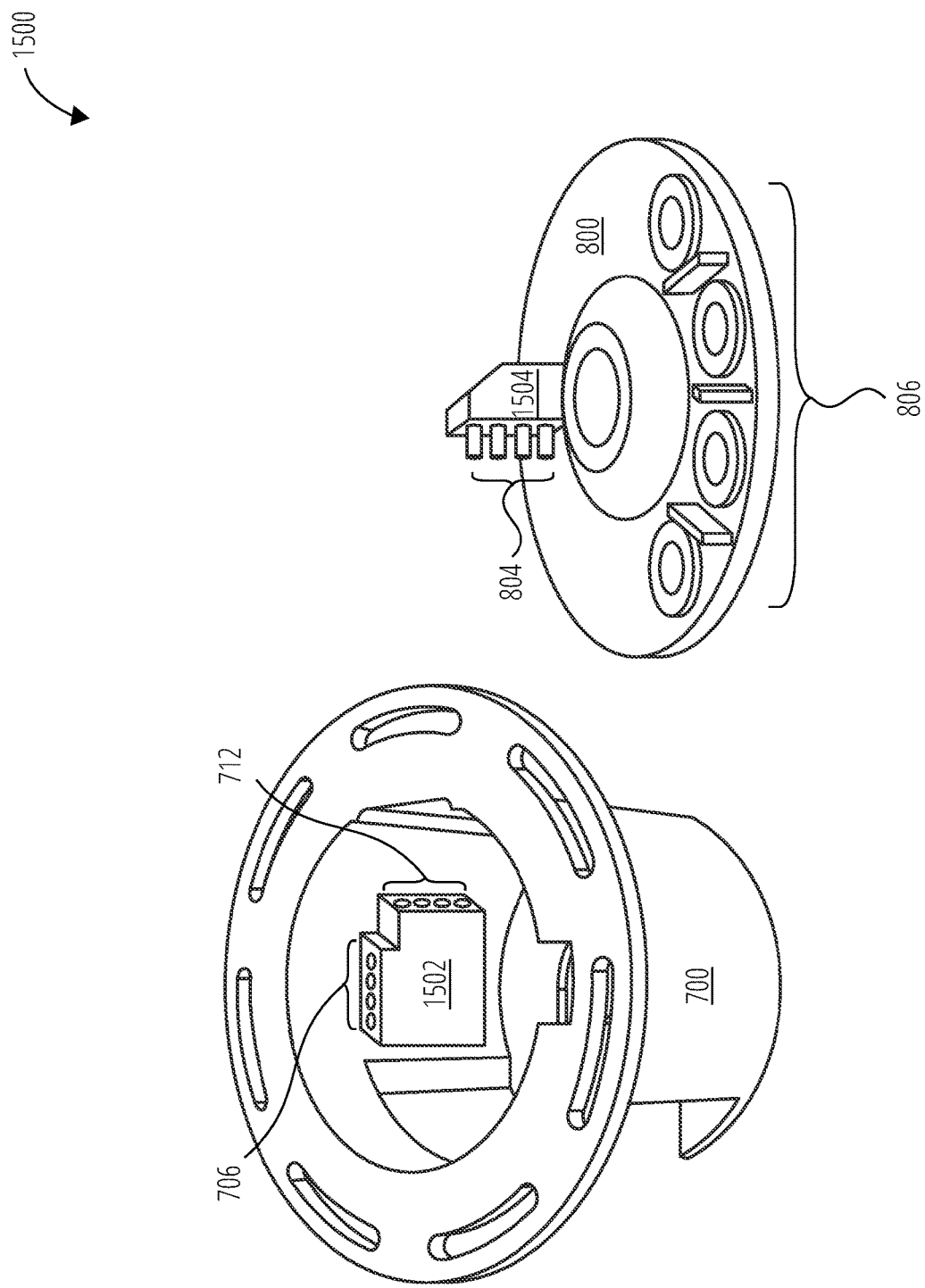
FIG. 15 illustrates a right-angle connector configured quick-connect system 1500 in accordance with one embodiment.

FIG. 15 illustrates a right-angle connector configured quick-connect system 1500 in accordance with one embodiment. The right-angle connector configured quick-connect system 1500 comprises a mounting mechanism 700, a coupling mechanism 800, a female right-angle connector 1502, and a male right-angle connector 1504.

The female right-angle connector 1502 of the mounting mechanism 700 may comprise the utility power contacts 706 as well as the female coupling mechanism power contacts 712 within a connector housing. The contacts may comprise connector pin sockets, having one-to-one metal plate connections, wired connections, or some other configuration comprising mounting mechanism electrical leads, interior to the female right-angle connector 1502. Examples of wire connectors may be seen in FIG. 16. In this manner, a wire connector wired to utility electrical power may mate with the utility power contacts 706 of the female right-angle connector 1502.

Similarly, the coupling mechanism 800 may be configured with a male right-angle connector 1504. In one embodiment, the male right-angle connector 1504 may incorporate the male coupling mechanism power contacts 804 as shown, in a wire connector configuration designed to mate with the female coupling mechanism power contact end of the female right-angle connector 1502. The male coupling mechanism power contacts 804 may be electrically connected to the fixture power contact 806 in a manner well understood by those skilled in the art.

In a further embodiment, the male right-angle connector 1504 may incorporate the fixture power contacts 806 as pins or sockets within a pin connector, allowing a mating connector wired to the fixture electrical leads or electrical fixture wiring to be seated at one end of the male right-angle connector 1504. The male right-angle connector 1504 may also be configured such that the electrical fixture wiring may be soldered or crimped directly to the pins then installed in a connector housing as the male coupling mechanism power contacts 804. In this manner, the same components may function as male coupling mechanism power contacts 804 and fixture power contacts 806.

While the embodiment illustrated is configured with right-angled connectors to accommodate the configuration and engaging action discussed with respect to FIG. 9, it may be easily seen by those skilled in the art that straight pass-through wire connectors may be used for embodiments of the mounting mechanism 700 and coupling mechanism 800 designed to engage in a different manner.

Figure 16:
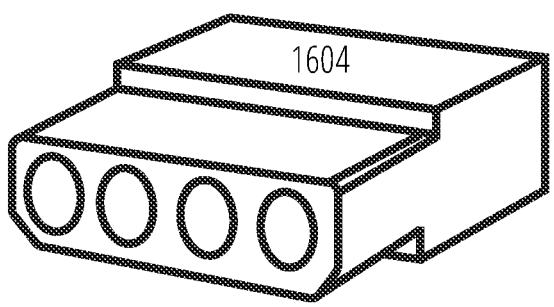
FIG. 16 illustrates mating wire connectors 1600 in accordance with one embodiment.

FIG. 16 illustrates mating wire connectors 1600 such as are readily available through electrical connector suppliers. The male wire connector 1602 and female wire connector 1604 illustrated show the basic construction for mating connectors that may comprise crimped pin wire terminals, screw terminals, wire clamps, or other configurations well understood in the art, to connect to building and fixture wiring. The mating wire connectors 1600 may further comprise molded latching or locking features to hold mated connectors together or may rely on friction to provide the latching force. Examples of these connectors may be MATE-N-LOCK rectangular power connectors by TE Connectivity.

It may be understood by those skilled in the art that right angle connector arrangements such as those described in FIG. 15 may be implemented with versions of this type of connector readily available for purchase.

Figure 17A:
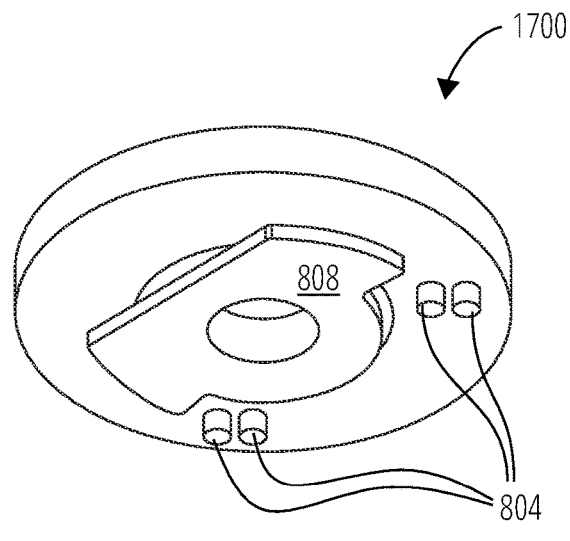
FIG. 17A and FIG. 17B illustrate a bottom view and a top view of a lighting electrical fixture coupling mechanism 1700, respectively, in accordance with one embodiment.
Figure 17B:
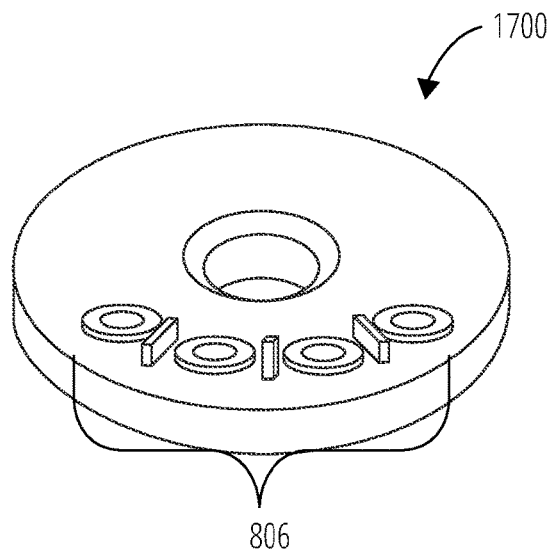

FIG. 17A and FIG. 17B illustrate a bottom view and a top view of a lighting electrical fixture coupling mechanism 1700, respectively, in accordance with one embodiment. The lighting electrical fixture coupling mechanism 1700 may be as described above with regard to electrical connectivity features such as the male coupling mechanism power contacts 804, fixture power contacts 806, and coupling mechanism electrical leads 1304 (not shown in these figures). The lighting electrical fixture coupling mechanism 1700 may also comprise a coupling mechanism latching feature 808 interfacing with the mounting mechanism 700 disclosed previously.

Because a lighting electrical fixture may lack the motive components of a ceiling fan electrical fixture, and thus not be subject to vibrational and rotational forces when the fixture is powered on, additional latching and locking features may not be needed. Thus the lighting electrical fixture coupling mechanism 1700 may in one embodiment represent a simplified version of the coupling mechanism 800, configured with those features needed to engage with the mounting mechanism 700 structurally and electrically, in order to electrically and structurally support the lighting electrical fixture, as may be understood by one skilled in the art.

Figure 18A:
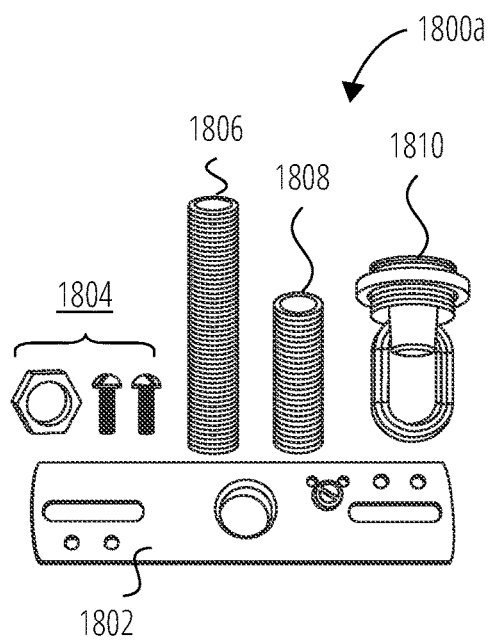
Figure 18B:
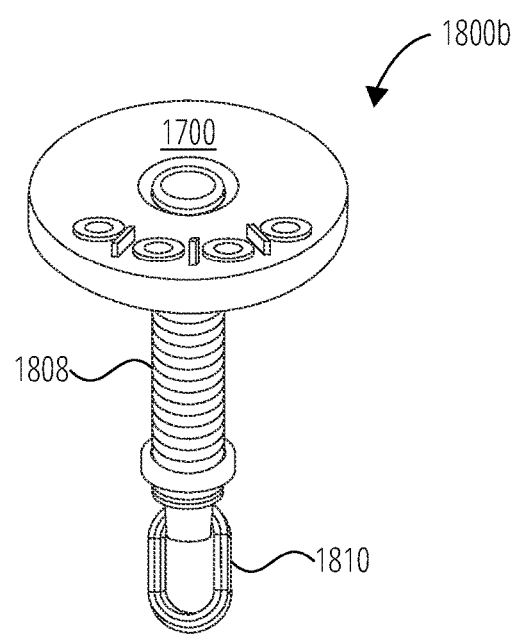
FIG. 18B illustrates mounting hardware for a lighting electrical fixture using the quick-connect system 1800b in accordance with one embodiment.

FIG. 18A and FIG. 18B illustrate the conventional mounting kit for a lighting electrical fixture 1800a and mounting hardware for a lighting electrical fixture using the quick-connect system 1800b, respectively. The conventional mounting kit for a lighting electrical fixture 1800a may comprise a conventional mounting crossbar 1802, mounting hardware 1804, a spacer rod 1806, a threaded downrod 1808, and a hanger loop 1810.

As may be seen in FIG. 18B, fewer components may be needed to mount a lighting electrical fixture when using the mounting hardware for a lighting electrical fixture using the quick-connect system 1800b comprising a mounting mechanism 700 (not shown) and a lighting electrical fixture coupling mechanism 1700. The lighting electrical fixture coupling mechanism 1700 may replace the crossbar in the traditional fixture hardware kit. This eliminates the need for the mounting hardware 1804. The hole in the center of the lighting electrical fixture coupling mechanism 1700 may be threaded to accommodate the threaded downrod 1808 in the conventional mounting kit for a lighting electrical fixture 1800a, to which the hanger loop 1810 may be attached to suspend and support the lighting electrical fixture.

Figure 19B:
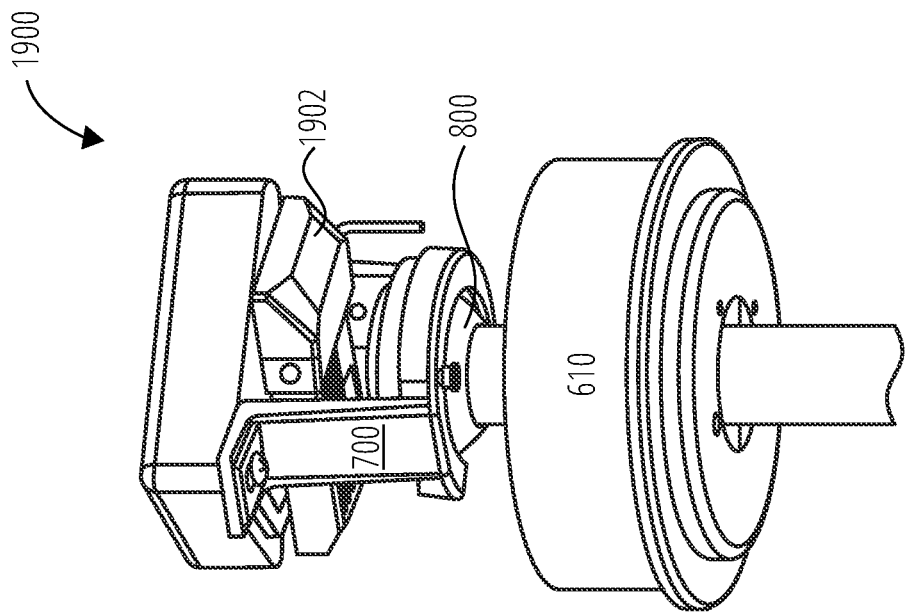
FIG. 19A and FIG. 19B illustrate wireless receiver installation 1900 in accordance with one embodiment.
Figure 19A:
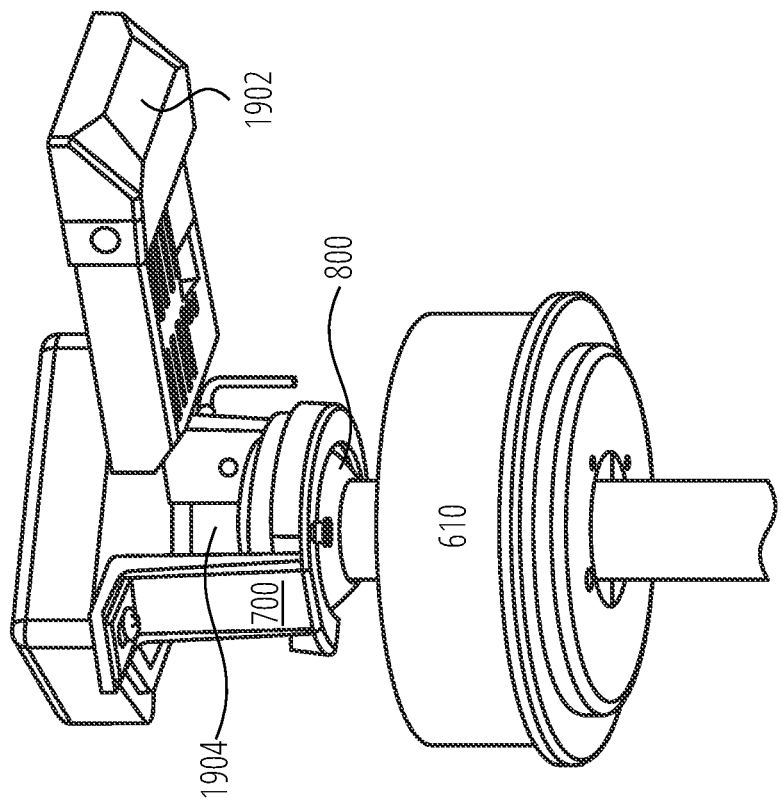

FIG. 19A and FIG. 19B illustrate a wireless receiver installation 1900 in accordance with one embodiment. The wireless receiver installation 1900 may comprise a wireless receiver 1902 being installed within a wireless receiver gap 1904 with which the mounting mechanism 700 is configured.

In such an embodiment, the mounting mechanism housing 702 may be configured such that when the coupling mechanism 800 is inserted and engaged, a sufficient wireless receiver gap 1904 remains, as shown. The wireless receiver 1902 may be secured within this gap by various means well understood by those skilled in the art. A decorative enclosure may be installed around the quick-connect system and wireless receiver 1902 in some embodiments. The wireless receiver 1902 may allow a user to control the function of the electrical fixture 610 using a remote control, smart device, or some other transmitter.

Figure 20A:
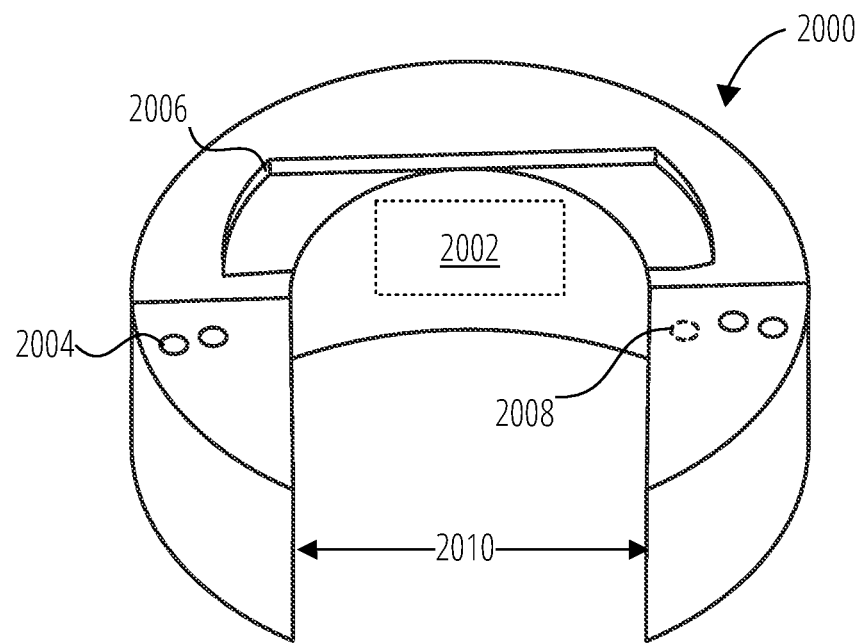
FIG. 20A illustrates a top view of an inline wireless receiver 2000 in accordance with one embodiment.
Figure 20B:
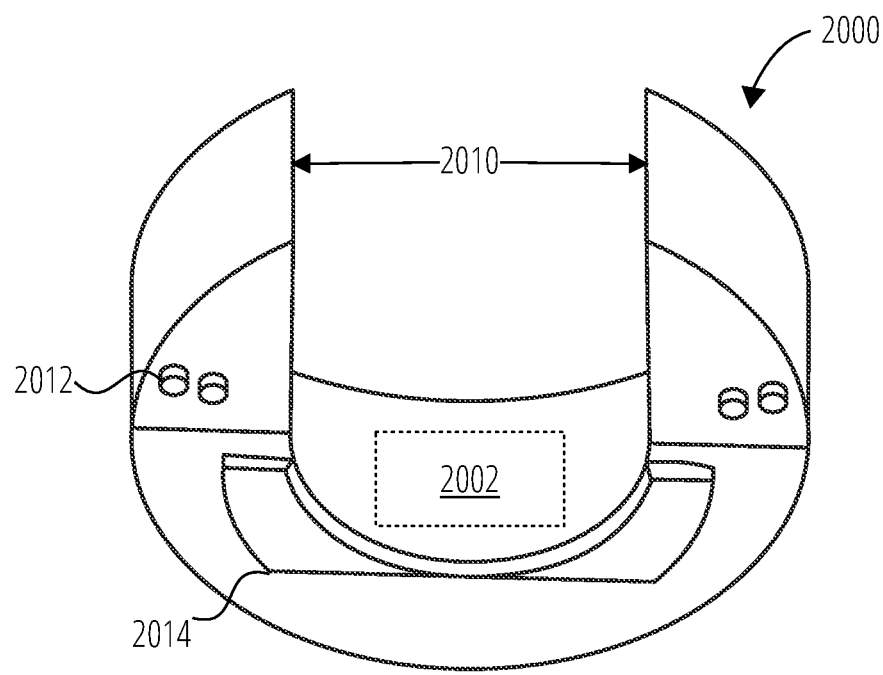
FIG. 20B illustrates a bottom view of an inline wireless receiver 2000 in accordance with one embodiment.

FIG. 20A and FIG. 20B illustrate an inline wireless receiver 2000 in accordance with one embodiment. FIG. 20A shows a top view of the inline wireless receiver 2000, where the face of the inline wireless receiver 2000 intended to engage with a coupling mechanism is visible. FIG. 20B shows a bottom view, illustrating the face intended to engage with a mounting mechanism.

The inline wireless receiver 2000 may comprise a wireless receiver control circuit 2002, wireless receiver female power contacts 2004, a wireless receiver coupling mechanism latching feature 2006, a wireless receiver female AC/DC power contact 2008, a wireless receiver coupling gap 2010, wireless receiver male power contacts 2012, and a wireless receiver mounting mechanism latching feature 2014. These features may be configured such that the inline wireless receiver 2000 couples to the mounting mechanism 700 in stead of the coupling mechanism 800, and the coupling mechanism 800 couples to the inline wireless receiver 2000 instead of the mounting mechanism 700, sandwiching the inline wireless receiver 2000 between the mounting mechanism 700 and coupling mechanism 800 while maintaining electrical and structural engagement as previously described, with the exception that the electrical engagement of the inline wireless receiver 2000 within the path of utility electrical power provides power to the wireless receiver control circuit 2002, and allows the wireless receiver control circuit 2002 to control operation of an attached electrical fixture. For example, the wireless receiver control circuit 2002 may turn a light fixture on and off by providing power, and may dim and brighten the light by modulating the power provided. Similarly, the wireless receiver control circuit 2002 may turn a fan on and off, and may slow down or speed up fan rotation by modulating provided power.

The wireless receiver female power contacts 2004 may be configured to engage with the male coupling mechanism power contacts of the coupling mechanism. In one embodiment, these may incorporate power contact tracks as implemented in the mounting mechanism as previously described. In another embodiment such as that illustrated, the wireless receiver female power contacts 2004 may simply be recessed within a housing of the inline wireless receiver 2000 in a manner that allows the male coupling mechanism power contacts to drop into the recesses and engage the wireless receiver female power contact 2004. In another embodiment, the inline wireless receiver 2000 and coupling mechanism may be configured to engage through a rotational motion, similar to the motion previously described to engage the coupling mechanism with the mounting mechanism. It will be well understood in the art that a number of configurations may be implemented to engage and in some embodiments latch the inline wireless receiver 2000 with the mounting mechanism and coupling mechanism to provide secure electrical and structural connection.

The wireless receiver coupling mechanism latching feature 2006 may be a recessed feature configured to accept and engage with the coupling mechanism latching feature. In one embodiment, the coupling mechanism latching feature may rotationally engage with the wireless receiver coupling mechanism latching feature 2006, similar to engagement with the mounting mechanism latching feature previously described. In one embodiment, the wireless receiver coupling mechanism latching feature 2006 may be designed for the coupling mechanism latching feature to drop in and be secured within the wireless receiver coupling mechanism latching feature 2006 through gravitational force. Other configurations will suggest themselves to those of ordinary skill in the art.

In one embodiment, the wireless receiver control circuit may convert utility electrical power, which is typically alternating current (AC) power, to direct current (DC) power, in order to supply DC power to the electrical fixture as part of controlling electrical fixture operation. Alternatively, an additional AC signal or a transformed AC signal may be implemented using an additional contact or contacts on the mounting mechanism, coupling mechanism, and inline wireless receiver 2000. An additional AC signal may be generated through splitting AC power provided from one of the contacts connected to utility electrical power. Transformed AC power may be generated by passing utility electrical power through a transformer to achieve modified voltage, current, phase, or frequency properties. DC power may be generated by passing the utility electrical power to an AC to DC converter. In such embodiments, the inline wireless receiver 2000 may also include one or more of the wireless receiver female AC/DC power contact 2008 illustrated, which will engage with a male coupling mechanism AC/DC power contact. This is described in greater detail with respect to FIG. 21.

The wireless receiver coupling gap 2010 may be provided to allow structural engagement of a coupling mechanism alone or a coupling mechanism previously engaged with an electrical fixture within the inline wireless receiver 2000. In some embodiments, this wireless receiver coupling gap 2010 may radially cut through the inline wireless receiver 2000, forming a crescent shape, such that the coupling mechanism may have an electrical fixture affixed and still be engaged within the center of the inline wireless receiver 2000 as shown. In one embodiment, the wireless receiver coupling gap 2010 may be a hole within the center of the inline wireless receiver 2000, such that the threaded connection portion of the coupling mechanism may be dropped through the central wireless receiver coupling gap 2010, rather than passing through a circumferential portion of the inline wireless receiver 2000.

The wireless receiver male power contacts 2012 may be configured to engage electrically with the female coupling mechanism power contacts in a manner similar to the process previously described with respect to engagement of the female coupling mechanism power contacts with the male coupling mechanism power contacts. Similarly, the wireless receiver mounting mechanism latching feature 2014 may be configured to engage structurally with the mounting mechanism latching feature in a manner similar to the process previously described with respect to engagement of the coupling mechanism latching feature with the mounting mechanism latching feature.

Figure 21:
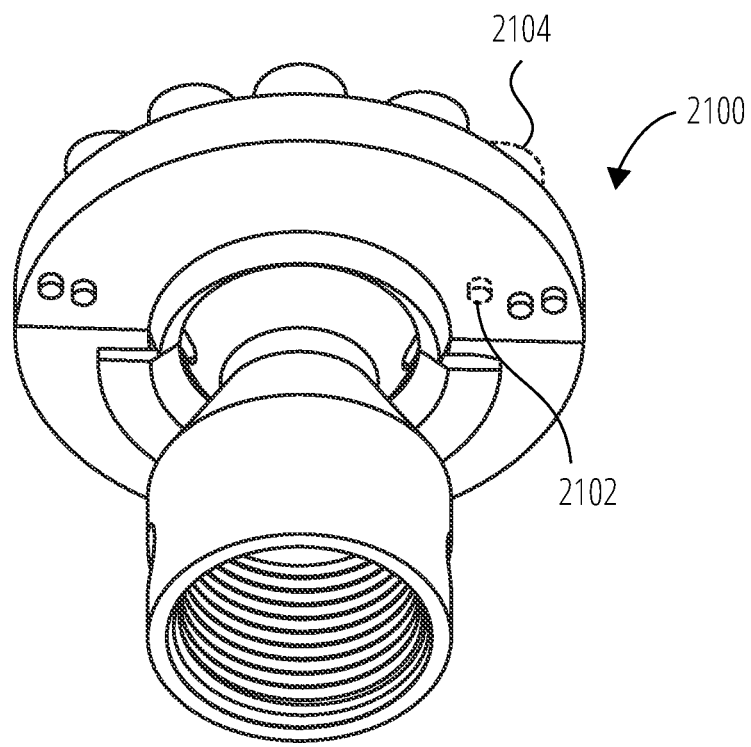
FIG. 21 illustrates a coupling mechanism with male coupling mechanism AC/DC power contact 2100 in accordance with one embodiment.

FIG. 21 illustrates a coupling mechanism with male coupling mechanism AC/DC power contact 2100 in accordance with one embodiment. In addition to the features described with respect to the coupling mechanism 800 of FIG. 8, the coupling mechanism with male coupling mechanism AC/DC power contact 2100 may comprise a male coupling mechanism AC/DC power contact 2102, and an AC/DC fixture power contact 2104. In one embodiment, this contact may be present on a coupling mechanism, and an inline wireless receiver 2000 or mounting mechanism 700 may be configured with a track or recess to accept this contact, but the corresponding female coupling mechanism power contact and electrical fixture power contact may remain electrically unconnected when power from this contact is not needed for electrical fixture operation.

In embodiments where the inline wireless receiver 2000 converts AC utility electrical power to a DC signal for use in controlling the electrical fixture, the male coupling mechanism AC/DC power contact 2102 may engage with the wireless receiver female AC/DC power contact 2008 previously described. An electrical lead within the coupling mechanism with male coupling mechanism AC/DC power contact 2100, similar to those illustrated in FIG. 13B, may carry that DC power to an AC/DC fixture power contact 2104. The AC/DC fixture power contact 2104 may be a screw terminal or other electrical connecting element, as previously described for the fixture power contacts 806, thus providing DC power from the inline wireless receiver 2000 to the electrical fixture through the coupling mechanism with male coupling mechanism AC/DC power contact 2100.

Figure 22:
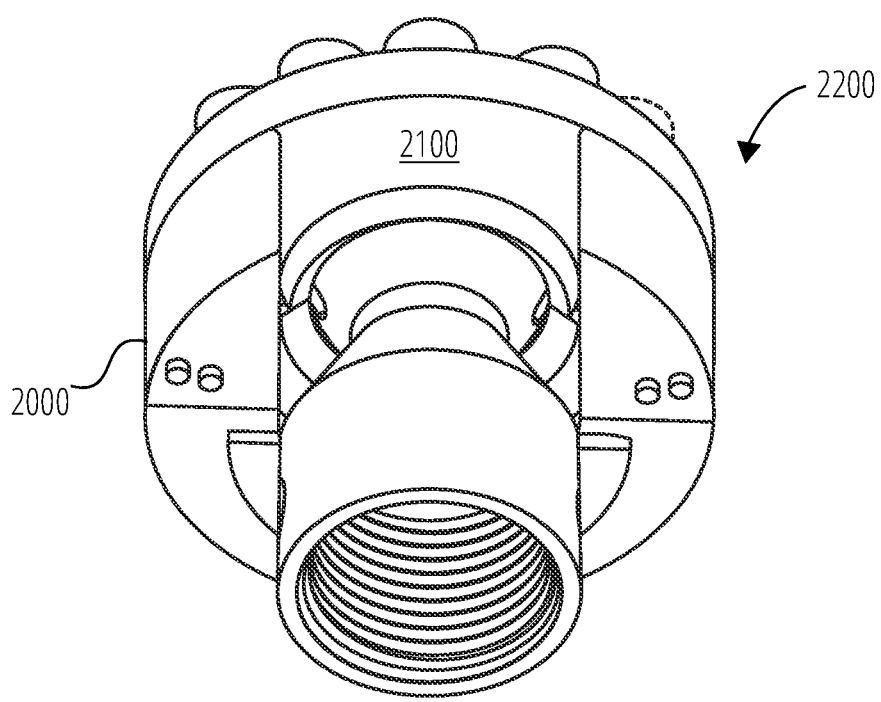
FIG. 22 illustrates a coupling mechanism engaged with inline wireless receiver 2200 in accordance with one embodiment.

FIG. 22 illustrates a coupling mechanism engaged with inline wireless receiver 2200 in accordance with one embodiment. The inline wireless receiver 2000 may couple structurally and electrically with a mounting mechanism as previously described. In this manner, the coupling mechanism with male coupling mechanism AC/DC power contact 2100 may couple electrically to the mounting mechanism through the inline wireless receiver 2000.

FIG. 23A-FIG. 23C illustrate another embodiment of the present disclosure. A mounting mechanism 2302 comprising an improved version of the traditional ceiling fan collar assembly illustrated in FIG. 3 is shown. By applying the elements disclosed with respect to FIG. 23A-FIG. 23C, the ceiling fan collar assembly bracket may be improved with the addition of electrical posts (one each for hot, neutral, and ground connections) that facilitate permanent connections to the building electrical service, and corresponding electrical leads in the collar assembly that facilitate a temporary electrical connection to the fixture.

FIG. 23A illustrates a top, right view of the mounting mechanism and coupling mechanism 2300a. Two of the utility power contacts of the mounting mechanism 2302 are visible: the hot utility power contact 2304 and the ground utility power contact 2306. FIG. 23B illustrates a top, left view of the mounting mechanism and coupling mechanism 2300b, in which the neutral utility power contact 2308 is shown.

The fixture interface at the bottom of the mounting mechanism 2302, where the female coupling mechanism power contacts are configured, may be shaped as concentric, cascading rings that provide both structural support and connection to the building electrical service. Each of the three utility power contacts on the mounting mechanism 2302 may connect via conductive material to an electrically conductive surface along the top surface of at least one of the rings. Each ring level on the fixture interface may be dedicated to a specific electrical connection, such as the hot female coupling mechanism power contact ring 2310, the ground female coupling mechanism power contact ring 2312, and the neutral female coupling mechanism power contact ring 2314 as illustrated.

FIG. 23C illustrates a bottom, right view of the mounting mechanism and coupling mechanism 2300c. In this view, it may be seen that the coupling mechanism 2316 may feature a complementary set of cascading support rings that fit into the rings in the mounting mechanism 2302. These are the hot male coupling mechanism power contact ring 2326, ground male coupling mechanism power contact ring 2328, and neutral male coupling mechanism power contact ring 2330 illustrated. Each ring in the coupling mechanism 2316 may be fitted with electrically conductive material affixed to the bottom surface of the ring that corresponds to the hot, neutral, and ground electrical connections.

The hot utility power contact 2304, ground utility power contact 2306, and neutral utility power contact 2308 of the mounting mechanism 2302 may be wired to the hot, neutral, and ground wires of utility electrical power, and may be electrically connected to the female coupling mechanism power contact rings. Through the quick-connect system engaging action 2324 shown, the female coupling mechanism power contact rings may contact the male coupling mechanism power contact rings shown in FIG. 23C. Electrically conductive material may, in turn, connect the hot male coupling mechanism power contact ring 2326, ground male coupling mechanism power contact ring 2328, and neutral male coupling mechanism power contact ring 2330 to the hot coupling mechanism electrical lead 2318, ground coupling mechanism electrical lead 2320, and neutral coupling mechanism electrical lead 2322, respectively. These coupling mechanism electrical leads may connect to the electrical components in the fixture.

In this manner, when quick-connect system engaging action 2324 is performed, the coupling mechanism 2316 may be seated in the mounting mechanism 2302, such that the three male coupling mechanism power contact rings contact their corresponding three female coupling mechanism power contact rings, thereby supplying electrical service to the electrical fixture through the engagement of the coupling mechanism 2316 with the mounting mechanism 2302.

The three support rings on the mounting mechanism 2302 may be positioned so that there is a safe distance between the hot, neutral, and ground connections. The electrically conductive material on each support ring may optionally be recessed into the rings to reduce the chance of an electrical short or an accidental shock from someone touching the inside of the mechanism. There may also be insulating barriers between each ring to further reduce the chance of electrical shorts or arcing.

Figure 24B:
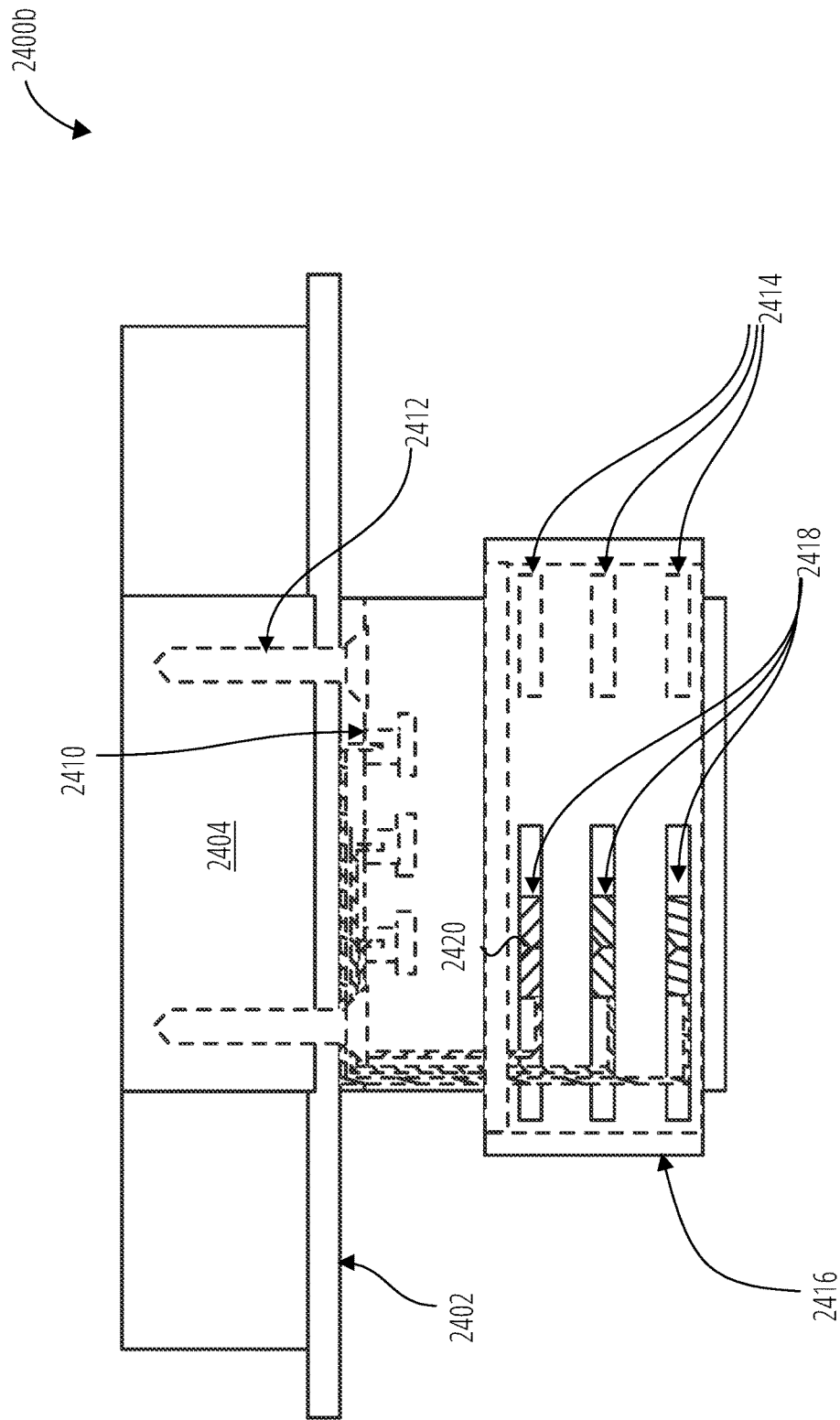
FIG. 24B illustrates a mounting mechanism side view showing a joist connection 2400b in accordance with one embodiment.
Figure 24C:
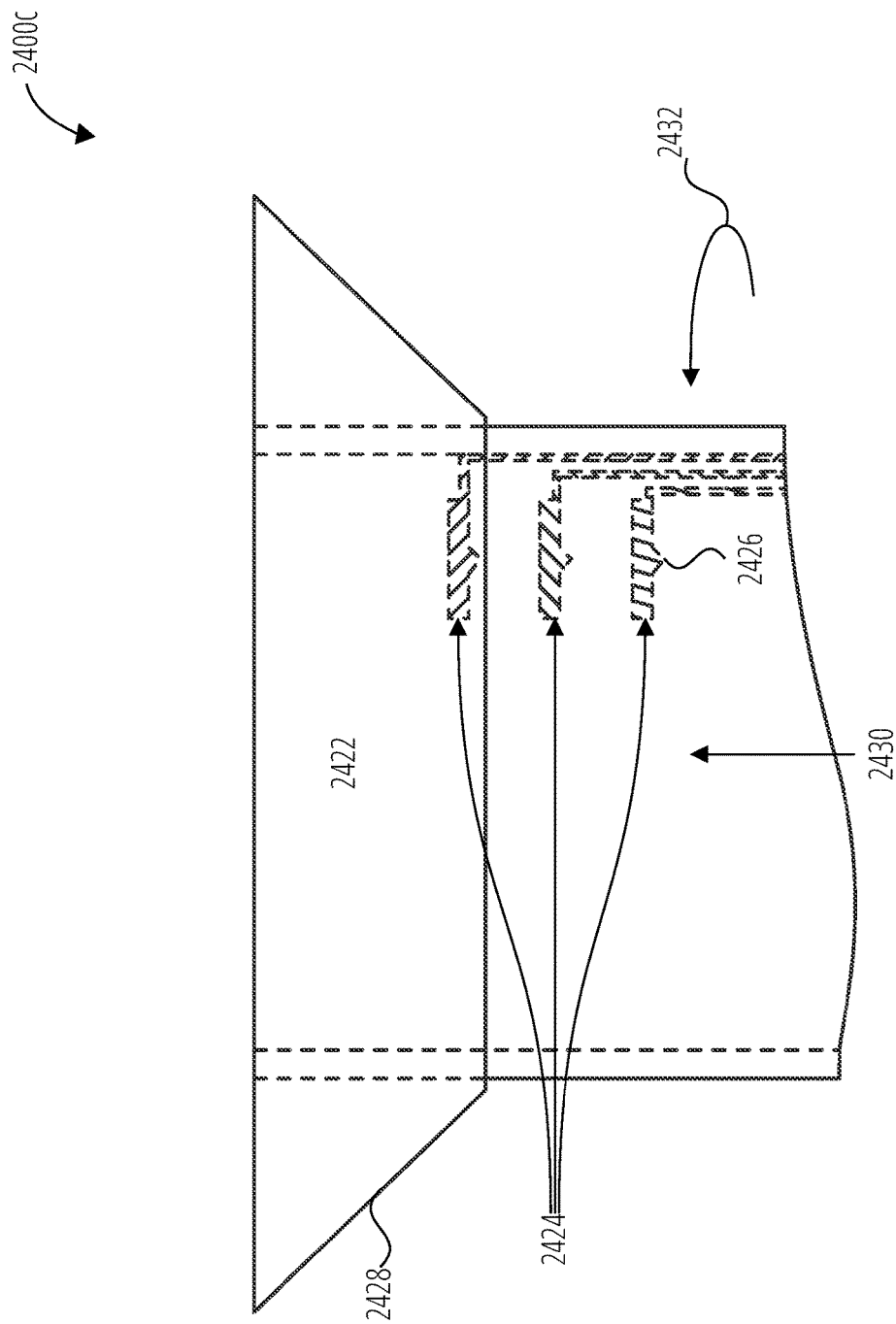
FIG. 24C illustrates a coupling mechanism side view 2400c in accordance with one embodiment.

FIG. 24A-FIG. 24F illustrate a mounting mechanism and coupling mechanism in accordance with one embodiment. FIG. 24A illustrates a mounting mechanism side view showing a junction box connection 2400a. FIG. 24B illustrates a mounting mechanism side view showing a joist connection 2400b. This embodiment of the present disclosure comprises a cylindrical mounting mechanism 2408 that may connect to the building structure at the ceiling 2402 by at least one of a direct connection to the ceiling joists 2404 and a connection to a ceiling junction box 2406 using fasteners 2412 such as machine screws. This embodiment may be used independently to secure a ceiling fixture or may be used in conjunction with an existing electrical junction box or fan box in situations where a retrofit installation is desired.

The mounting mechanism 2408 may include three utility power contacts 2410 (one each for hot, neutral, and ground electrical connections) on the outside top surface of the mounting mechanism 2408 where the mounting mechanism 2408 is connected to a ceiling junction box 2406 as shown in FIG. 24A. These utility power contacts 2410 may act as permanent connections to the building power supply. Alternatively, as shown in FIG. 24B, the utility power contacts 2410 may be positioned on the inside top surface of the mounting mechanism 2408 if the mounting mechanism 2408 is connected to ceiling joists 2404 using fasteners 2412 such as wood screws.

The mounting mechanism 2408 may include three horizontal support rings 2414 positioned along the outside surface of the cylindrical body of the mounting mechanism 2408 with at least one ring dedicated to each type of electrical connection needed for the fixture to function (e.g., hot, neutral, and ground). Each horizontal support ring 2414 may include an electrically conductive area along its top surface forming a female coupling mechanism power contact 2418 that may connect via a wire or electrically conductive strip to one of the utility power contacts 2410 at the top of the mounting mechanism.

Notched areas 2420 in the top surface of the support rings may fit with corresponding latch points 2426 on the male coupling mechanism power contacts 2424 of the coupling mechanism 2422 (described below) to reinforce the electrical connections between the mounting mechanism 2408 and the coupling mechanism 2422 and may also secure the fixture against rotation once the coupling mechanism 2422 is connected to the mounting mechanism 2408.

The three horizontal support rings 2414 on the ceiling bracket mounting mechanism 2408 may be positioned so that there is a safe distance between the exposed hot, neutral, and ground connections on the rings. The female coupling mechanism power contacts 2418 on each support ring may optionally be recessed into the rings to reduce the chance of an electrical short. To protect against an accidental shock from someone touching the female coupling mechanism power contacts 2418 on the mechanism, the mechanism may include a free-moving, cylindrical, electrically insulating collar 2416 to cover the exposed electrical connections when the fixture is not attached. The electrically insulating collar 2416 may be in the down position covering the female coupling mechanism power contacts 2418 when a fixture is not attached and may slide up during fixture installation to expose the female coupling mechanism power contacts 2418.

FIG. 24C illustrates a coupling mechanism side view 2400*c*. FIG. 24C shows the coupling mechanism 2422 engaging with this mounting mechanism 2408. The coupling mechanism 2422 design may also be cylindrical and may feature tabs along the inside surface of the cylinder that fit into the rings in the mounting mechanism 2408. The tabs may provide structural support for the fixture and may also include male coupling mechanism power contacts 2424 with latch points 2426 along the bottom surface to facilitate an electrical connection between the mounting mechanism 2408 and the fixture. An angled flange 2428 at the top may provide a flush ceiling mount.

Connecting the coupling mechanism 2422 to the mounting mechanism 2408 may be accomplished by a first engaging motion 2430 that aligns the coupling mechanism 2422 tabs with openings in the mounting mechanism 2408 rings and pushes the coupling mechanism 2422 upward such that the tabs align with the gaps between the rings. Finally, a second engaging motion 2432 may turn the coupling mechanism 2422 until the latch points 2426 on the male coupling mechanism power contacts 2424 align with the notched areas 2420 in the mounting mechanism 2408 support rings.

Figure 24D:
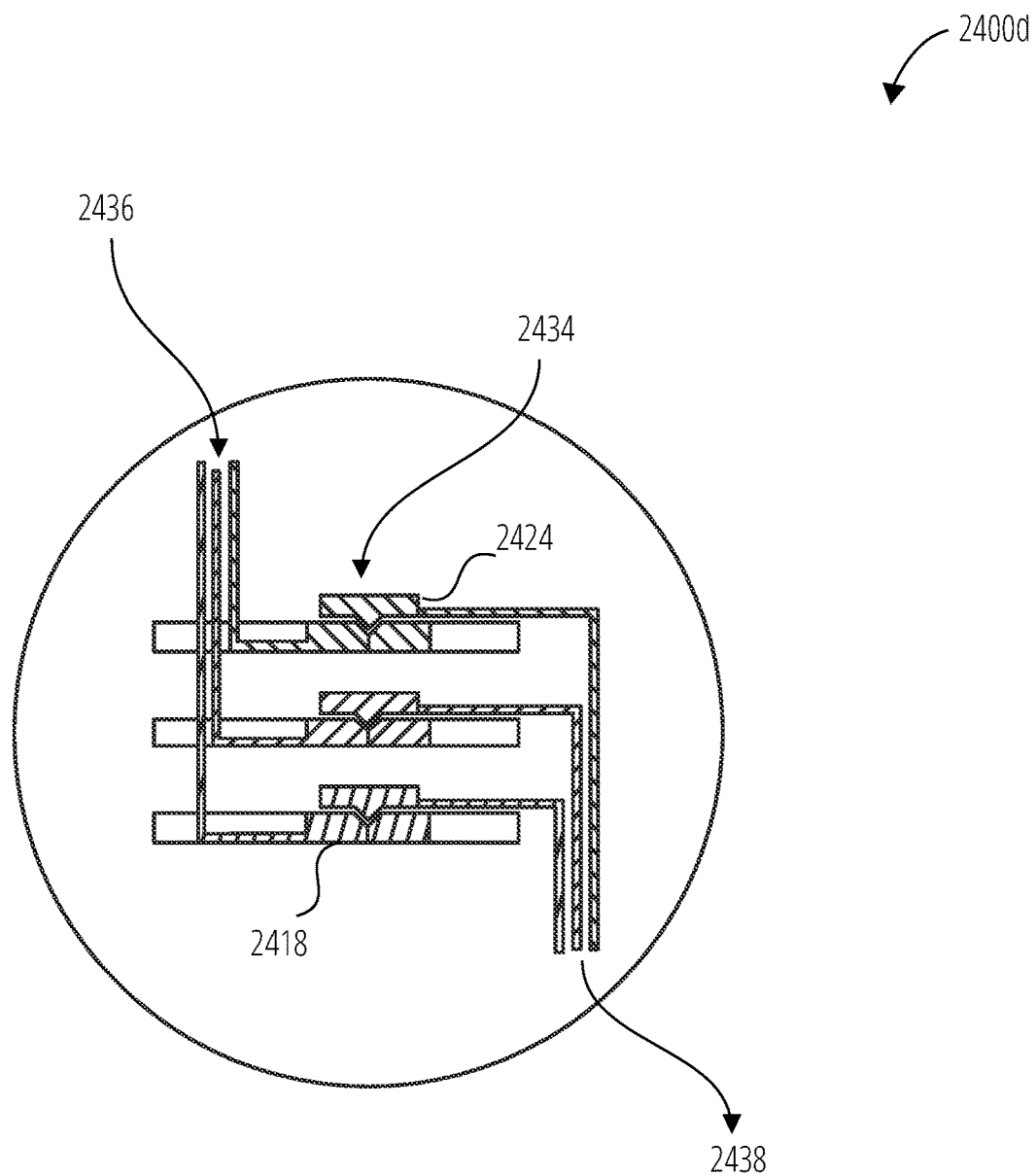
FIG. 24D illustrates an electrical connection between the mounting mechanism and the coupling mechanism 2400d in accordance with one embodiment.

FIG. 24D illustrates an electrical connection between the mounting mechanism and the coupling mechanism 2400*d*. FIG. 24D shows the latch points and notched areas aligned 2434, such that the female coupling mechanism power contact 2418 and male coupling mechanism power contact 2424 are electrically connected and prevented from accidental rotation and disconnect. In this position, utility electrical power 2436 flows through the electrical connections established by the mounting mechanism and coupling mechanism, providing power to electrical fixture 2438.

Figure 24E:
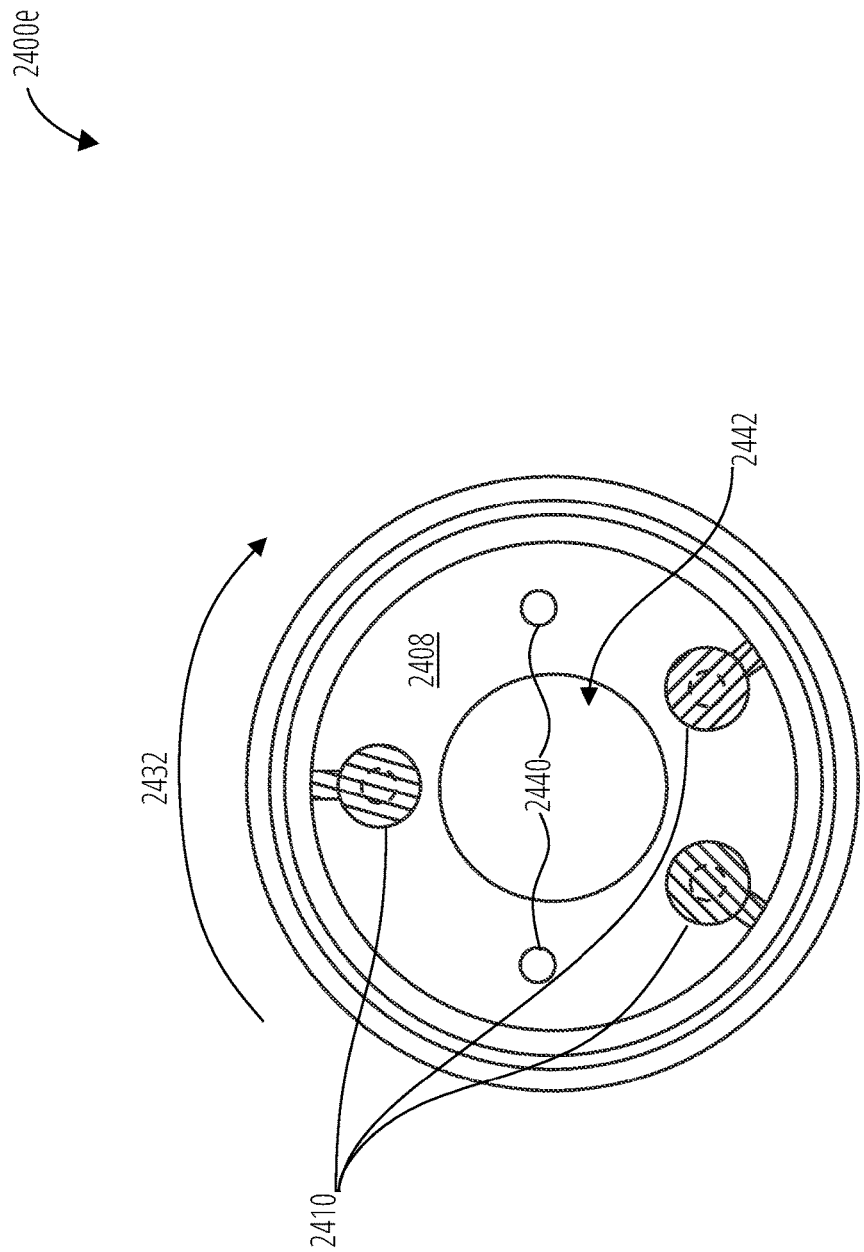
FIG. 24E illustrates a mounting mechanism bottom view 2400e in accordance with one embodiment.

FIG. 24E illustrates a mounting mechanism bottom view 2400*e*. FIG. 24E shows the utility power contacts 2410 on the inside top surface of the mounting mechanism 2408. The utility power contacts 2410 may connect via electrical strips or wires to female coupling mechanism power contacts laminated onto the top of horizontal support rings. Ceiling structural connection points 2440 may be implemented as smaller holes on either side of a main center hole 2442 to allow the mounting mechanism 2408 to attach to the ceiling support system via screws or some other fastener type. The center hole 2442 may accommodate utility electrical power wiring connected to the utility power contacts 2410.

Figure 24F:
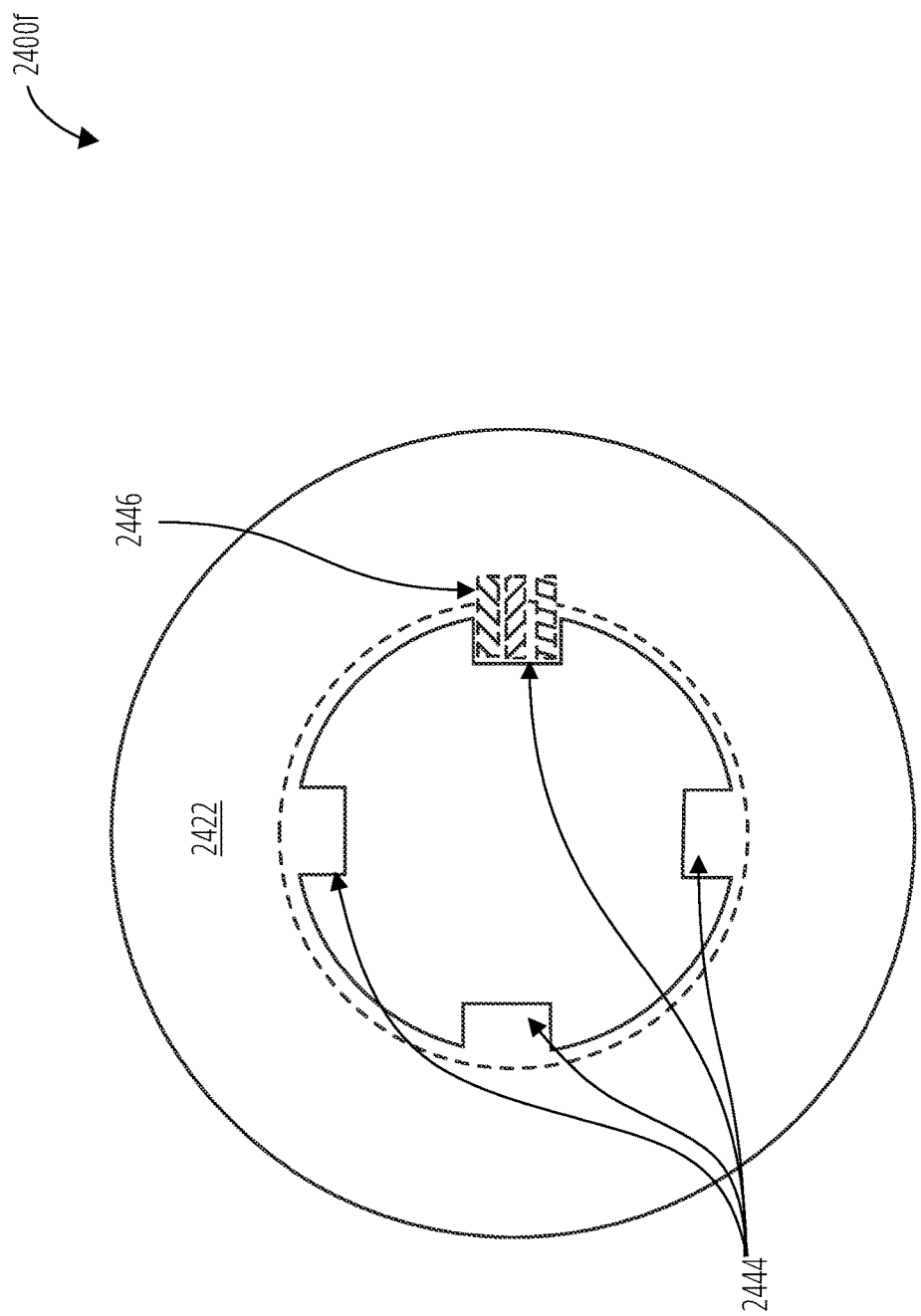
FIG. 24F illustrates a coupling mechanism bottom view 2400f in accordance with one embodiment.

FIG. 24F illustrates a coupling mechanism bottom view 2400*f*. FIG. 24F shows the coupling mechanism 2422 with tabs 2444 along the inside surface that fit into the support rings of the mounting mechanism 2408 and provide structural support and facilitate connection with electrical service when connected to the mounting mechanism 2408. Utility power contacts 2446 may be laminated to bottom surface of each tab. The utility power contacts 2446 may connect via wires to the fixture electrical contacts.

LISTING OF DRAWING ELEMENTS 100 conventional ceiling installation
102 step
104 step
106 step
108 step
110 step
112 step
200 conventional support hook solution
202 mounting bracket
204 electrical fixture
206 support hook
300 conventional fan bracket
302 inner contours
304 fan bracket ceiling structural connection point
400 quick-connect system routine
402 block
404 block
406 block
500 block diagram of a complete installation
502 building physical structure
504 utility electrical power
506 quick-connect system
508 electrical fixture with compatible coupling interface
510 load-bearing physical support
512 electrical connection
514 physical support and electrical connectivity
600*a* top exploded view of a complete assembly with ceiling fan electrical fixture
600*b* top exploded view of a complete assembly with lighting electrical fixture
602 ceiling support system
604 utility wiring
606 conventional junction box
608 electrical fixture wiring
610 electrical fixture
612 ceiling fan electrical fixture
614 lighting electrical fixture
700 mounting mechanism
702 mounting mechanism housing
704 ceiling structural connection point
706 utility power contact
708 wire connector
710 coupling gap
712 female coupling mechanism power contact
714 power contact track
716 insertion end
718 terminal end
720 coupling mechanism structural support
722 mounting mechanism latching feature
724 hole for a spring-loaded locking pin or set screw
726 external face
728 wireless receiver gap
730 fastener
800 coupling mechanism
802 coupling mechanism housing
804 male coupling mechanism power contact
806 fixture power contact 808 coupling mechanism latching feature
810 hole for a securing pin
812 screw terminal
814 threaded connection
816 spring-loaded locking pin
900 quick-connect system engaging actions
902 first engaging motion
904 second engaging motion
906 coupling mechanism seated in mounting mechanism
1000 quick-connect system with a locking feature installed
1002 coupling locking tab
1004 set screw or spring-loaded locking pin
1100 quick-connect system structural connections
1102 mounting mechanism structural support
1104 coupling mechanism structural support
1106 securing pin
1108 electrical fixture structural support
1200 coupling mechanism configured with an angle-mount joint
1202 ball joint
1204 joint pivot pin
1206 joint pivot pin slot
1208 angled ceiling
1300 quick-connect system electrical connections
1302 mounting mechanism electrical lead
1304 coupling mechanism electrical lead
1306 fixture electrical lead
1308 power to electrical fixture
1400a mounting mechanism cutaway side view
1400b mounting mechanism cutaway side view terminal end close up
1402 contact recess drop-off
1404 male coupling mechanism power contact recess
1500 right-angle connector configured quick-connect system
1502 female right-angle connector
1504 male right-angle connector
1600 mating wire connectors
1602 male wire connector
1604 female wire connector
1700 lighting electrical fixture coupling mechanism
1800a conventional mounting kit for a lighting electrical fixture
1800b mounting hardware for a lighting electrical fixture using the quick-connect system
1802 conventional mounting crossbar
1804 mounting hardware
1806 spacer rod
1808 threaded downrod
1810 hanger loop
1900 wireless receiver installation
1902 wireless receiver
1904 wireless receiver gap
2000 inline wireless receiver
2002 wireless receiver control circuit
2004 wireless receiver female power contact
2006 wireless receiver coupling mechanism latching feature
2008 wireless receiver female AC/DC power contact
2010 wireless receiver coupling gap
2012 wireless receiver male power contact
2014 wireless receiver mounting mechanism latching feature
2100 coupling mechanism with male coupling mechanism AC/DC power contact
2102 male coupling mechanism AC/DC power contact
2104 AC/DC fixture power contact
2200 coupling mechanism engaged with inline wireless receiver
2300a top, right view of the mounting mechanism and coupling mechanism
2300b top, left view of the mounting mechanism and coupling mechanism
2300c bottom, right view of the mounting mechanism and coupling mechanism
2302 mounting mechanism
2304 hot utility power contact
2306 ground utility power contact
2308 neutral utility power contact
2310 hot female coupling mechanism power contact ring
2312 ground female coupling mechanism power contact ring
2314 neutral female coupling mechanism power contact ring
2316 coupling mechanism
2318 hot coupling mechanism electrical lead
2320 ground coupling mechanism electrical lead
2322 neutral coupling mechanism electrical lead
2324 quick-connect system engaging action
2326 hot male coupling mechanism power contact ring
2328 ground male coupling mechanism power contact ring
2330 neutral male coupling mechanism power contact ring
2400a mounting mechanism side view showing a junction box connection
2400b mounting mechanism side view showing a joist connection
2400c coupling mechanism side view
2400d electrical connection between the mounting mechanism and the coupling mechanism
2400e mounting mechanism bottom view
2400f coupling mechanism bottom view
2402 ceiling
2404 ceiling joist
2406 ceiling junction box
2408 mounting mechanism
2410 utility power contact
2412 fastener
2414 horizontal support ring
2416 electrically insulating collar
2418 female coupling mechanism power contact
2420 notched area
2422 coupling mechanism
2424 male coupling mechanism power contact
2426 latch point
2428 angled flange
2430 first engaging motion
2432 second engaging motion
2434 latch points and notched areas aligned
2436 utility electrical power
2438 power to electrical fixture
2440 ceiling structural connection point
2442 center hole
2444 tab
2446 utility power contact Reciting in the appended claims that a structure is "configured to" perform one or more tasks is expressly intended not to invoke 35 U.S.C. § 112(f) for that claim element. Accordingly, claims in this application that do not otherwise include the "means for" [performing a function] construct should not be interpreted under 35 U.S.C § 112(f).

As used herein, the term "based on" is used to describe one or more factors that affect a determination. This term does not foreclose the possibility that additional factors may affect the determination. That is, a determination may be solely based on specified factors or based on the specified factors as well as other, unspecified factors. Consider the phrase "determine A based on B." This phrase specifies that B is a factor that is used to determine A or that affects the determination of A. This phrase does not foreclose that the determination of A may also be based on some other factor, such as C. This phrase is also intended to cover an embodiment in which A is determined based solely on B. As used herein, the phrase "based on" is synonymous with the phrase "based at least in part on."

As used herein, the phrase "in response to" describes one or more factors that trigger an effect. This phrase does not foreclose the possibility that additional factors may affect or otherwise trigger the effect. That is, an effect may be solely in response to those factors, or may be in response to the specified factors as well as other, unspecified factors. Consider the phrase "perform A in response to B." This phrase specifies that B is a factor that triggers the performance of A. This phrase does not foreclose that performing A may also be in response to some other factor, such as C. This phrase is also intended to cover an embodiment in which A is performed solely in response to B.

As used herein, the terms "first," "second," etc. are used as labels for nouns that they precede, and do not imply any type of ordering (e.g., spatial, temporal, logical, etc.), unless stated otherwise.

When used in the claims, the term "or" is used as an inclusive or and not as an exclusive or. For example, the phrase "at least one of x, y, or z" means any one of x, y, and z, as well as any combination thereof.

Having thus described illustrative embodiments in detail, it will be apparent that modifications and variations are possible without departing from the scope of the disclosure as claimed. The scope of disclosed subject matter is not limited to the depicted embodiments but is rather set forth in the following claims.

What is claimed is:

1. An apparatus comprising:
a mounting mechanism including:
at least one ceiling structural connection point configured to accept at least one fastener to provide mounting mechanism structural support between the mounting mechanism and a ceiling support system;
at least two utility power contacts configured to electrically connect to utility electrical power;
at least two female coupling mechanism power contacts, each electrically connected to one of the at least two utility power contacts by one of at least two mounting mechanism electrical leads;
a mounting mechanism housing configured to:
receive and connect to a coupling mechanism using a quick-connect system;
provide coupling mechanism structural support; and
insulate the at least two mounting mechanism electrical leads; and
a coupling mechanism including:
at least two male coupling mechanism power contacts configured to electrically connect to the at least two female coupling mechanism power contacts of the mounting mechanism using the quick-connect system;
at least two fixture power contacts, each electrically connected to one of the at least two male coupling mechanism power contacts by one of at least two coupling mechanism electrical leads;
a coupling mechanism housing configured to:
connect to and receive structural support from the mounting mechanism housing using the quick-connect system;
provide electrical fixture structural support; and
insulate the at least two coupling mechanism electrical leads;
wherein at least two fixture electrical leads of an electrical fixture are configured to receive the utility electrical power through connection with the at least two fixture power contacts of the coupling mechanism;
the mounting mechanism further comprising at least two power contact tracks, each having a terminal end and an insertion end,
wherein the insertion end is configured to accept one of the at least two male coupling mechanism power contacts as the coupling mechanism is engaged with the mounting mechanism,
wherein the terminal end comprises a male coupling mechanism power contact recess and one of the at least two female coupling mechanism power contacts,
wherein each of the at least two male coupling mechanism power contacts of the coupling mechanism is configured to slide from the insertion end to the terminal end along the power contact track as the coupling mechanism is engaged with the mounting mechanism, and
wherein each of the at least two male coupling mechanism power contacts is configured to drop into the male coupling mechanism power contact recess, to connect to the one of the at least two female coupling mechanism power contacts at the terminal end, providing a tactile response confirming the male coupling mechanism power contact is electrically connected to the female coupling mechanism power contact and electrically connecting the male coupling mechanism power contact to the female coupling mechanism power contact through force of weight of the electrical fixture and coupling mechanism.

2. The apparatus of claim 1, wherein the mounting mechanism is configured with a mounting mechanism latching feature and the coupling mechanism is configured with a coupling mechanism latching feature, and wherein the mounting mechanism latching feature and the coupling mechanism latching feature are configured to engage to prevent vibration of the electrical fixture from structurally and electrically disengaging the coupling mechanism from the mounting mechanism by restricting motion of the coupling mechanism within the mounting mechanism.

3. The apparatus of claim 1, further comprising a set screw, wherein the set screw is configured to prevent the coupling mechanism from disengaging from the mounting mechanism.

4. The apparatus of claim 1, the coupling mechanism further comprising:
an angle-mount joint; and
at least one joint pivot pin;
wherein the mounting mechanism is configured for installation on an angled ceiling; and
wherein the angle-mount joint is configured to allow the coupling mechanism to engage with the mounting mechanism and suspend the electrical fixture at an angle other than ninety degrees from the angled ceiling.

5. The apparatus of claim 1, wherein the at least two utility power contacts are screw terminals each configured to secure utility wiring carrying the utility electrical power terminated with at least one of bare-wire pigtails, spade terminals, hook terminals, and ring terminals.

6. The apparatus of claim 1, wherein the at least two utility power contacts comprise at least one wire connector configured to connect with a mating wire connector terminating utility wiring carrying the utility electrical power.

7. The apparatus of claim 1, wherein the at least two fixture power contacts are screw terminals each configured to secure electrical fixture wiring terminated with at least one of bare-wire pigtails, spade terminals, hook terminals, and ring terminals.

8. The apparatus of claim 1, wherein the at least two fixture power contacts comprise at least one wire connector configured to connect with a mating wire connector terminating electrical fixture wiring.

9. The apparatus of claim 1, wherein the mounting mechanism housing is configured with a wireless receiver gap configured to allow a wireless receiver to be mounted within the quick-connect system.

10. The apparatus of claim 9, further comprising:
an inline wireless receiver, comprising:
  a wireless receiver control circuit configured to control operation of the electrical fixture;
  a wireless receiver coupling gap configured to allow structural engagement of at least one of the coupling mechanism and the electrical fixture engaged with the coupling mechanism with the inline wireless receiver;
  at least two wireless receiver male power contacts configured to electrically engage with the at least two female coupling mechanism power contacts of the mounting mechanism;
  at least two wireless receiver female power contacts configured to electrically engage with the at least two male coupling mechanism power contacts of the coupling mechanism;
  a wireless receiver coupling mechanism latching feature configured to securely engage with a coupling mechanism latching feature to prevent vibration and movement of the coupling mechanism with respect to the inline wireless receiver; and
  a wireless receiver mounting mechanism latching feature configured to securely engage with a mounting mechanism latching feature to prevent vibration and movement of the inline wireless receiver with respect to the mounting mechanism.

11. The apparatus of claim 10, further comprising:
the inline wireless receiver including at least one wireless receiver female alternating current/direct current (AC/DC) power contact,
wherein the wireless receiver control circuit is configured to provide at least one of additional AC power, transformed AC power, and DC power generated from the utility electrical power for use in used in controlling operation of the electrical fixture, and
wherein the at least one of the additional AC power, the transformed AC power, and the DC power is connected to the at least one wireless receiver female AC/DC power contact; and
the coupling mechanism including:
  at least one male coupling mechanism AC/DC power contact configured to engage with the at least one wireless receiver female AC/DC power contact; and
  at least one AC/DC fixture power contact electrically connected to the at least one male coupling mechanism AC/DC power contact.

12. The apparatus of claim 1, comprising:
the mounting mechanism configured with a female right-angle connector comprising the at least two utility power contacts, the at least two mounting mechanism electrical leads, and the at least two female coupling mechanism power contacts; and
the coupling mechanism configured with a male right-angle connector comprising the at least two male coupling mechanism power contacts.

13. The apparatus of claim 1, wherein external faces of the mounting mechanism are configured to conform to inner contours of a fan bracket.

* * * * *